(12) United States Patent
Lee et al.

(10) Patent No.: US 10,592,721 B2
(45) Date of Patent: Mar. 17, 2020

(54) BIOMETRIC AUTHENTICATION DEVICE

(71) Applicant: LG ELECTRONICS INC., Seoul (KR)

(72) Inventors: Junhak Lee, Seoul (KR); Jiho Yoo, Seoul (KR); Seonghyok Kim, Seoul (KR); Chaedeok Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/124,471

(22) Filed: Sep. 7, 2018

(65) Prior Publication Data

US 2019/0370527 A1 Dec. 5, 2019

(30) Foreign Application Priority Data

Jun. 1, 2018 (KR) .......... 10-2018-0063792
Jun. 27, 2018 (KR) .......... 10-2018-0074199

(51) Int. Cl.
*G06F 21/32* (2013.01)
*G06K 9/00* (2006.01)

(52) U.S. Cl.
CPC ..... *G06K 9/00033* (2013.01); *G06K 9/00087* (2013.01); *G06K 9/00912* (2013.01); *G06K 9/00926* (2013.01); *G06K 2009/00932* (2013.01)

(58) Field of Classification Search
CPC ....... G06K 9/00087; G06K 2009/0006; G06K 2009/00932; G06K 9/00033; G06K 9/00288; G06K 9/00255; G06F 21/32; H04N 5/33; H04N 5/2256; H04N 5/23212
See application file for complete search history.

(56) References Cited

U.S. PATENT DOCUMENTS

| | | | |
|---|---|---|---|
| 5,899,863 A * | 5/1999 | Hatfield | A61B 8/06 128/916 |
| 6,311,085 B1 * | 10/2001 | Meaney | A61B 5/055 600/420 |
| 6,488,377 B2 * | 12/2002 | Matsumoto | A61B 3/145 351/206 |
| 7,550,707 B2 * | 6/2009 | Hashimoto | G06K 9/20 250/221 |
| 7,944,498 B2 * | 5/2011 | Sung | G02B 7/38 348/252 |

(Continued)

FOREIGN PATENT DOCUMENTS

| | | |
|---|---|---|
| EP | 2879072 A1 | 6/2015 |
| EP | 3264321 A1 | 1/2018 |

(Continued)

*Primary Examiner* — Philip P. Dang
(74) *Attorney, Agent, or Firm* — Birch, Stewart, Kolasch & Birch, LLP

(57) ABSTRACT

A biometric authentication device including an infrared luminescent unit configured to emit infrared light with an infrared wavelength; a depth sensing unit configured to receive the infrared light reflected on a vein of an object placed within a preset distance of the depth sensing unit; a controller configured to control the depth sensing unit to obtain a first vein image of a first object and calculate a first distance value corresponding to a first distance between the depth sensing unit and the first object, and store the first vein image and the first distance value in a memory as registration information.

18 Claims, 21 Drawing Sheets

(56) References Cited

U.S. PATENT DOCUMENTS

| | | | | |
|---|---|---|---|---|
| 8,223,199 B2* | 7/2012 | Kiyomizu | G06K 9/00 348/61 |
| 8,280,484 B2* | 10/2012 | Boyden | A61B 5/02007 356/432 |
| 8,488,050 B2* | 7/2013 | Ueda | G03B 13/36 348/333.04 |
| 8,724,857 B2* | 5/2014 | Derakhshani | G06K 9/00597 382/117 |
| 8,811,690 B2* | 8/2014 | Dumont | G06K 9/00 382/127 |
| 8,839,720 B2* | 9/2014 | Stewart | F41A 17/066 102/301 |
| 8,850,535 B2* | 9/2014 | Liberman | H04L 9/3231 726/6 |
| 8,850,536 B2* | 9/2014 | Liberman | H04L 9/0866 713/186 |
| 8,995,726 B2* | 3/2015 | Amano | G06K 9/00885 382/115 |
| 9,100,825 B2* | 8/2015 | Schultz | H04W 12/06 |
| 9,323,912 B2* | 4/2016 | Schultz | G06F 21/32 |
| 9,345,427 B2* | 5/2016 | Wood | A61B 5/0059 |
| 9,408,530 B2* | 8/2016 | Ferren | A61B 1/041 |
| 9,417,188 B2* | 8/2016 | Ishihara | A61B 1/00009 |
| 9,553,859 B2* | 1/2017 | Slaby | H04L 63/08 |
| 9,560,042 B2* | 1/2017 | Okazaki | G06F 1/1616 |
| 9,588,046 B2* | 3/2017 | Ishihara | A61B 1/00009 |
| 9,672,471 B2* | 6/2017 | Boyden | A61B 5/02007 |
| 9,805,214 B2* | 10/2017 | Sahu | H04W 12/0013 |
| 9,811,299 B2* | 11/2017 | Nobutani | G06F 21/32 |
| 10,002,242 B2* | 6/2018 | Jakobsson | H04L 63/0861 |
| 10,007,831 B2* | 6/2018 | Semba | G06K 9/00087 |
| 10,028,676 B2* | 7/2018 | Freeman | G16Z 99/00 |
| 10,121,059 B2* | 11/2018 | Yoo | G06K 9/00228 |
| 10,201,425 B2* | 2/2019 | Ku | A61F 2/2475 |
| 2007/0038118 A1* | 2/2007 | DePue | A61B 5/1171 600/476 |
| 2008/0107309 A1* | 5/2008 | Cerni | G06K 9/00033 382/115 |
| 2008/0317293 A1* | 12/2008 | Sakurai | G06K 9/00013 382/115 |
| 2009/0304237 A1* | 12/2009 | Yoshikawa | A61B 5/1172 382/116 |
| 2010/0046807 A1 | 2/2010 | Sato | |
| 2012/0194662 A1* | 8/2012 | Zhang | G06K 9/00033 348/77 |
| 2012/0300989 A1* | 11/2012 | Nakashima | G06K 9/00046 382/115 |
| 2016/0004917 A1* | 1/2016 | Yoshida | A61B 90/36 382/115 |
| 2016/0328600 A1* | 11/2016 | Che | G06T 7/11 |
| 2017/0011210 A1* | 1/2017 | Cheong | A61B 5/0022 |
| 2017/0206332 A1* | 7/2017 | Piccin | G16H 50/30 |
| 2018/0014734 A1* | 1/2018 | Rogers | A61B 5/0048 |
| 2018/0045918 A1* | 2/2018 | Seo | G02B 9/60 |

FOREIGN PATENT DOCUMENTS

| | | |
|---|---|---|
| JP | 2013-206002 A | 10/2013 |
| KR | 10-2012-0074358 A | 7/2012 |
| KR | 10-2016-0141566 A | 12/2016 |
| KR | 10-1733639 B1 | 5/2017 |
| WO | WO 2016/089529 A1 | 6/2016 |

* cited by examiner (a)

(b)

(a)

(b)

(a)

(b)

(a)

| Registration information ||
|---|---|
| Distance value | Vein image |
| First distance value | First vein image |
| Second distance value | Second vein image |
| ... | ... |
| Ninth distance value | Ninth vein image |
| Tenth distance value | Tenth vein image |

(b)

(a)

| Authentication object biometric information ||
|---|---|
| Distance value | Vein image |
| First distance value | First vein image |

(b)

(a)

(b)

BIOMETRIC AUTHENTICATION DEVICE

CROSS-REFERENCE TO RELATED APPLICATIONS

This application claims priority to Korean Patent Application No. 10-2018-0063792 filed on Jun. 1, 2018, and No. 10-2018-0074199 filed on Jun. 27, 2018, in the Republic of Korea, the entire contents of which is hereby incorporated by reference in its entirety.

BACKGROUND OF THE DISCLOSURE

1. Field of the Disclosure

Embodiments of the present disclosure relate to a biometric authentication device configured to implement biometric authentication, using a user's vein pattern.

2. Background of the Disclosure

Recently, a biometric authentication device is invented to perform diverse functions as well as a simple communication function for calls and textures and requires high security settings. As one of the security settings, a biometric authentication device supports authentication methods, using a user's biometric information as well as code numbers and pattern input.

Typical examples of the authentication methods using biometric information include fingerprint, iris pattern and face recognition authentication methods. However, even the authentication using such biometric information cannot guarantee the perfect security and there are continuous demands for another authentication method.

In response to such demands and trend, vein authentication comes to the force as fairly typical example of the biometric authentication. However, a user has to put their hand on a conventional vein authentication device uncomfortably. Also, the user's hand has to be fixedly put on the conventional vein authentication device. If the distance or location of the user's hand is varied, vein authentication cannot be performed. That is, the distance or location is limited to minimize a sensor module use to photograph an image of the vein, spaced a preset distance apart.

SUMMARY OF THE DISCLOSURE

Accordingly, an object of the present invention is to address the above-noted and other problems.

Embodiments of the present disclosure provide a biometric authentication device for solving the problems of an uncomfortable conventional vein authentication and slow authentication speed.

Embodiments of the present disclosure provide a biometric authentication device including an infrared luminescent unit configured to emit light with an infrared wavelength; a depth sensing unit configured to receive the light reflected on a vein of an object after emitted from the infrared luminescent unit and acquire a vein image from the received light and calculate a distance value of the object; and a memory configured to store the vein image acquired by the depth sensing unit and the distance value calculated by the depth sensing unit therein as registration information. In addition, the registration information includes distance values and vein images for a first object which are calculated or acquired according to a plurality of distances.

Embodiments of the present disclosure also provide a biometric authentication device including an infrared luminescent unit configured to emit light having an infrared wavelength; a depth sensing unit configured to receive the light reflected on a vein of an object after emitted from the infrared luminescent unit and acquire a vein image from the received light and calculate a distance value of the object; and a memory configured to store the vein image acquired by the depth sensing unit and the distance value calculated by the depth sensing unit therein as registration information. Further, the registration information includes a distance value calculated for a first object and a vein image according to the distance value acquired for the first object, and the depth sensing unit acquires or calculates a vein image and a distance value for a second object, and upsizes or downsizes at least one of the vein images of the first and second objects based on the distance value of the first object and the distance value of the second object and compare the upsized or downsized vein image with the other vein image and calculates a matching rate based on the result of the comparison.

The mobile terminal in accordance with the present disclosure has the following advantages. According to the embodiments of the present disclosure, the user can perform security authentication conveniently. Furthermore, a security authentication level and the security authentication speed are enhanced.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
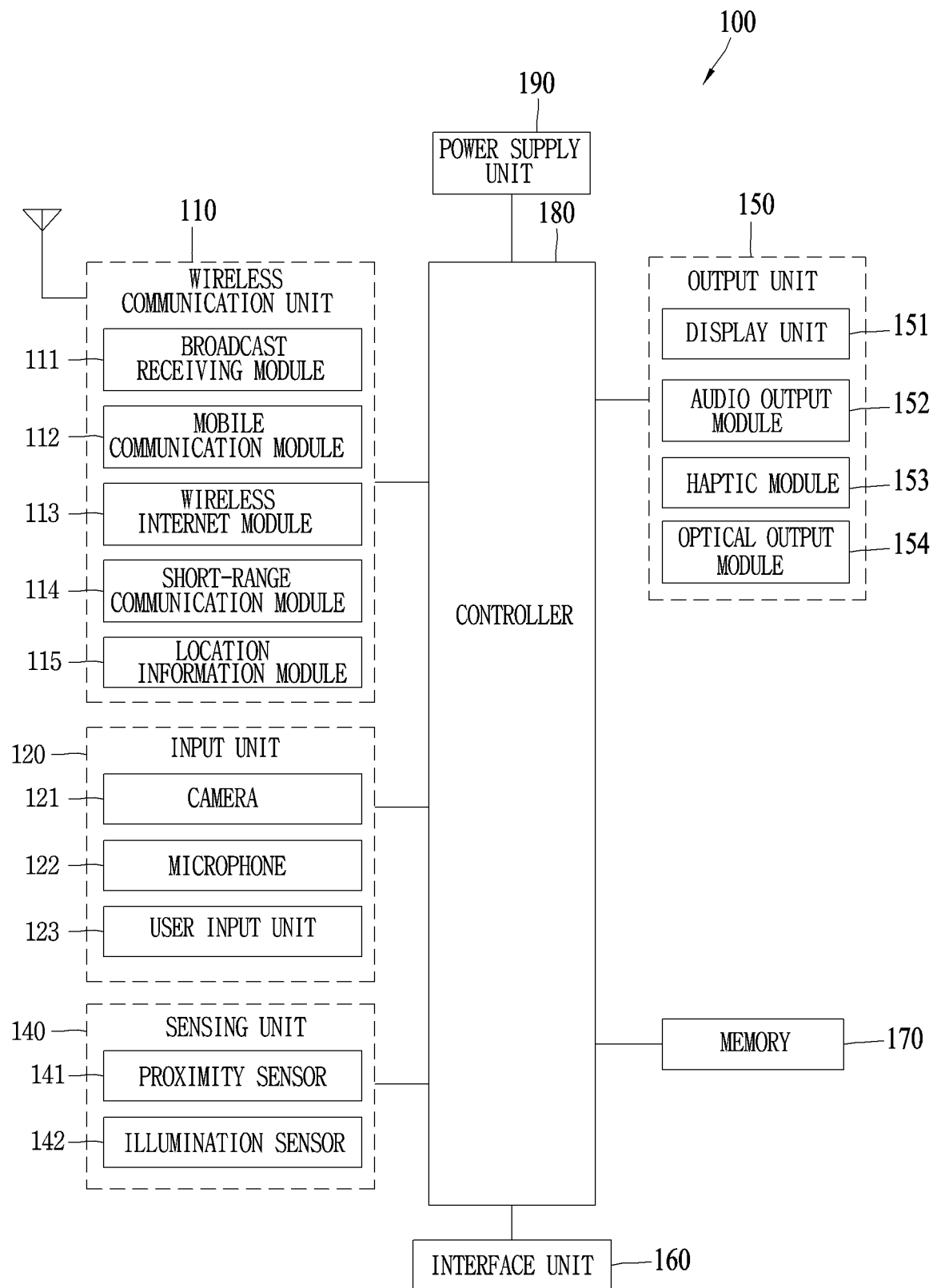
FIG. 1A is a block diagram illustrating a biometric authentication device in accordance with the present disclosure.
Figure 1B:
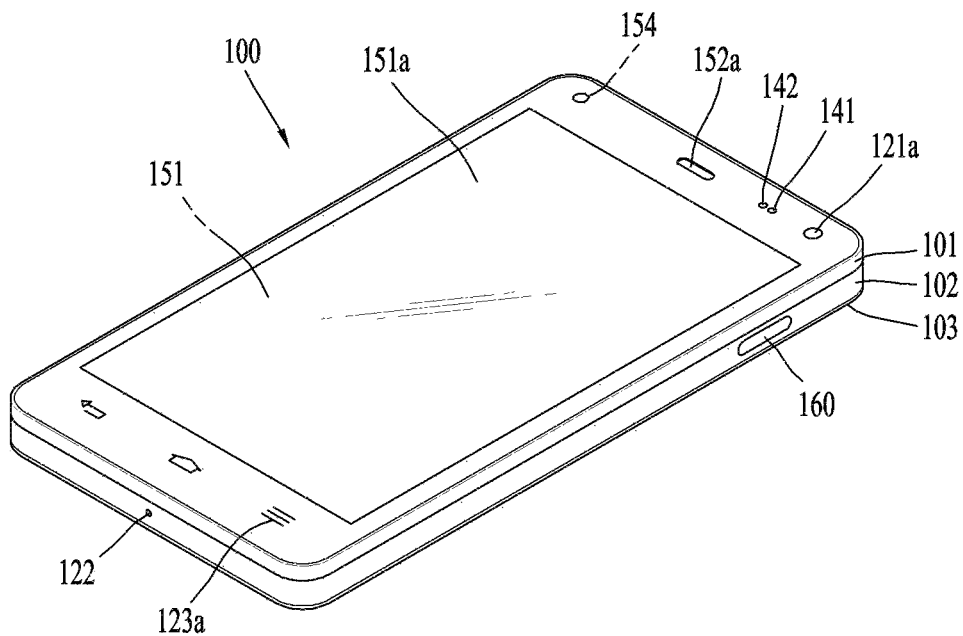
FIG. 1B and 1C are conceptual diagrams of one embodiment of the biometric authentication device, viewed from different directions.
Figure 1C:
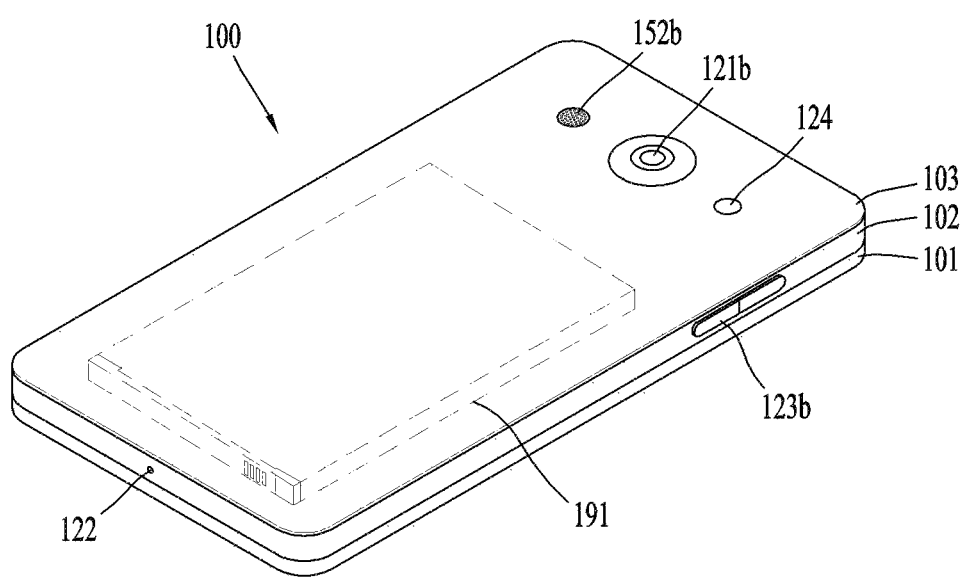

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The sensing unit 140 may also include a depth sensor 200 acquiring or computing biometric information of an object. Details will be described later. In addition, the output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, information and the like input or output through the above-mentioned components and/or runs application programs saved in the memory 170, thereby processing or providing a user with appropriate information and/or functions.

The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The arithmetic unit 240 performs necessary arithmetic operations and processes under the control of the control unit 180. As will be described later, the control unit 180 and the arithmetic unit 240 may be implemented in the same chipset, or may be provided in separate chipsets.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components mentioned in the foregoing description can cooperatively operate to embody operations, controls or controlling methods of the mobile terminal according to various embodiments of the present invention mentioned in the following description. Moreover, the operations, controls or controlling methods of the mobile terminal can be embodied in the mobile terminal by running at least one or more application programs saved in the memory 170.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the first audio output unit 152a, the second audio output unit 152b, the proximity sensor 141, the illumination sensor 142, the optical output unit 154, the first camera 121a, the second camera 121b, the first manipulating unit 123a, the second manipulating unit 123b, the microphone 122, the interface unit 160, and the like.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently foiined to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
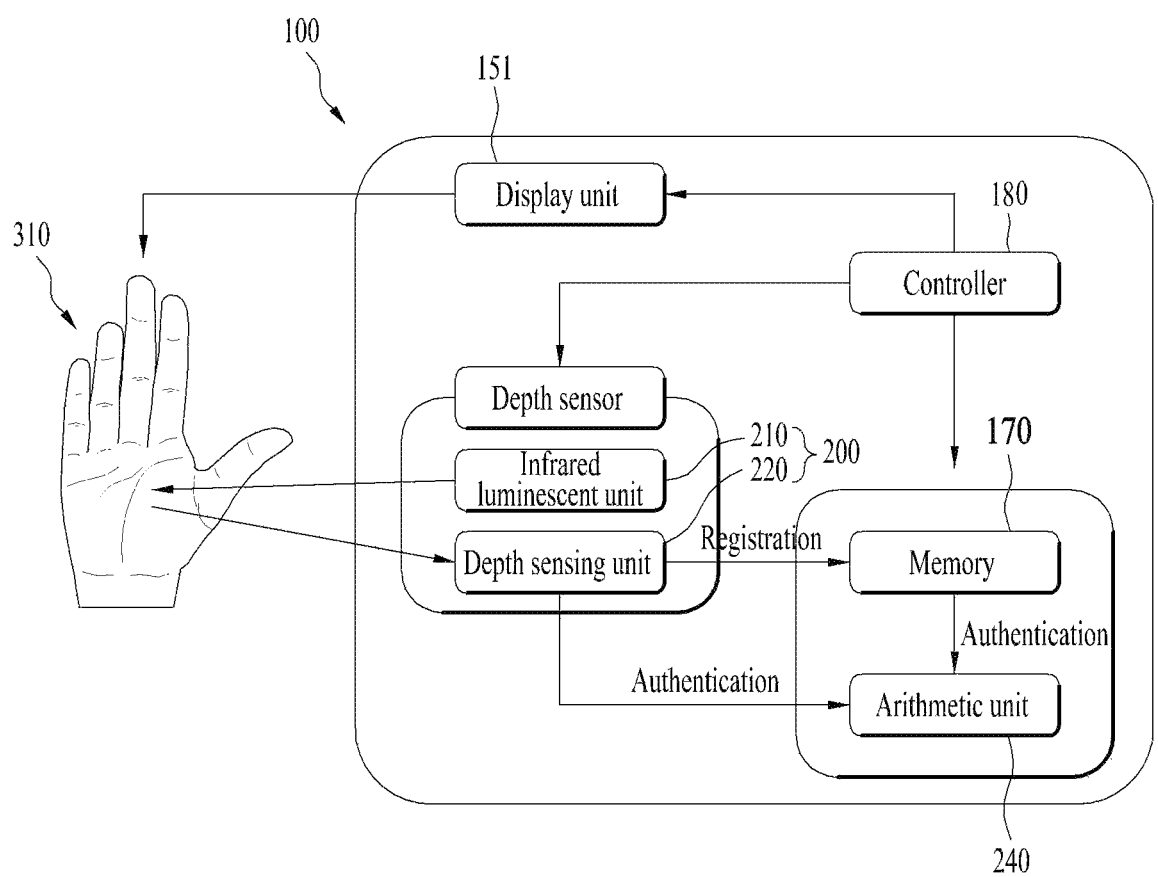
FIG. 2 is a block diagram illustrating key elements of the biometric authentication device.

FIG. 2 is a block diagram illustrating key elements of the biometric authentication device including an infrared luminescent unit 210; a depth sensing unit 220, a memory 170, an arithmetic unit 240, a display unit 151 and a controller 180. A depth sensor 200 configured of the infrared luminescent unit 210 and the depth sensing unit 220 can be provided as one module unit and loaded in the biometric authentication device 100.

The arithmetic unit 240 and the controller 180 can be physically provided as a chipset which is loaded in the biometric authentication device 100. Further, the chipset functioning as the arithmetic unit 240 and the controller 180 can be loaded on a printed circuit board. The chipset realized as the arithmetic unit 240 and the controller 180 can be an application processor (AP functioning as a CPU, GPU, a communication chip, sensor and the like. In other words, the application processor may corresponding to a SOC (System on Chip).

The implementation processes and functions of the arithmetic unit 230 and the controller 180 can be performed by another different type of a chipset or other types of physical structures, beside the application processor or the system-on-chip. As one example, some processes or functions performed by the arithmetic unit 240 or the controller 180 can be realized by a chipset provided in the depth sensing unit 220 which will be described later.

The biometric authentication device 100 is configured to emit light to an object 310 including the vein through the elements and receive light to acquire biometric information. The biometric information acquirable through the process includes, for example, one or more of a vein image, a distance value of the object 310, a depth value of the object 310, an angle of the object 310 and horizontal location information about the object 310. The biometric information about the location and angle of the object 310, except the vein image, has a relative value with respect to the biometric authentication device 100 or the depth sensor 200.

The biometric authentication device 100 can perform biometric information registration and biometric authentication based on the biometric information. Such biometric information will be described in more detail later. The following description will be made referring to the accompanying drawings together with the block diagram of FIG. 2.

Figure 3:
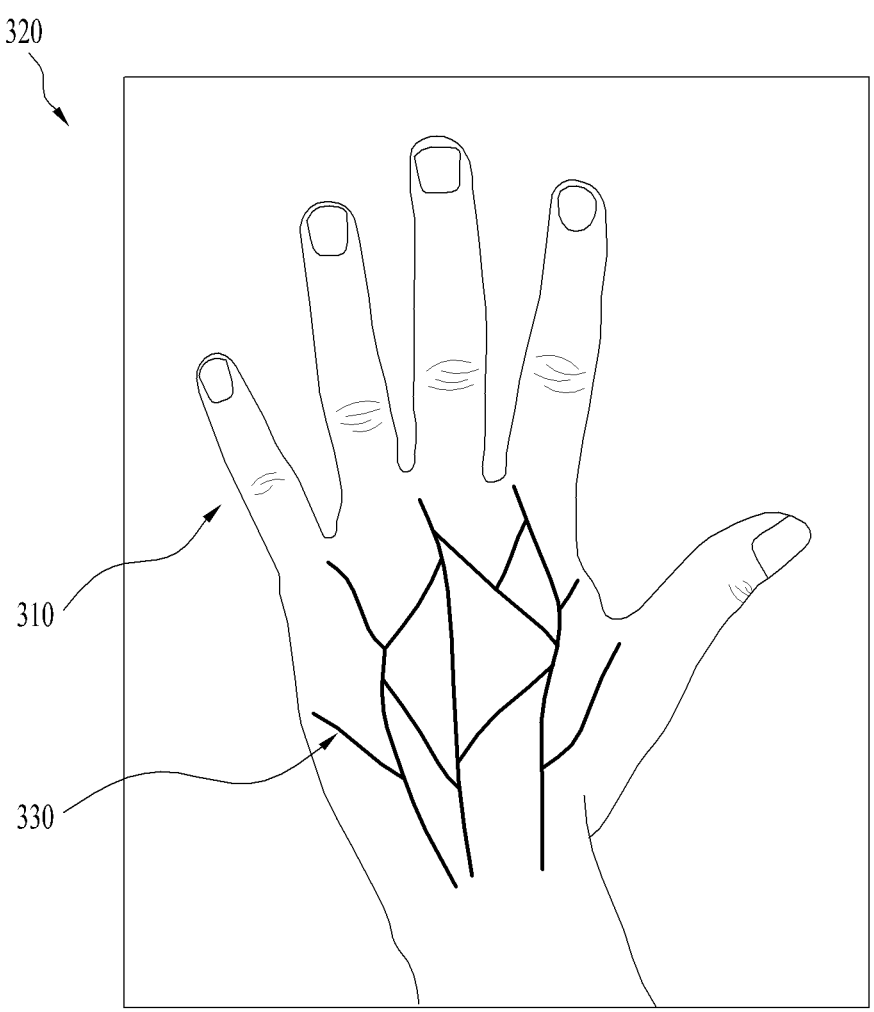
FIG. 3 is a diagram illustrating one embodiment of a vein image associated with the present disclosure.

FIG. 3 is a diagram illustrating one embodiment of a vein image 320 associated with the present disclosure. The vein image 320 corresponds to an imaged structure of a vein 330 acquired from the object 310. The object 310 may be any human body parts of which veins 330 are imaged. As one example, the object 310 may be the user's hand. The user can accurately manipulate their hand according to his or her intension and the hand is usually exposed outside, while including the vein sufficiently, such that it is proper to use the hand as the object 310 for biometric authentication. The following embodiments are based on the premise that the object 310 is the user's hand, but is not limited thereto. Diverse body parts such as the face, arms or legs may be used as the object 310.

In addition, a vein 330 is distributed in the object 310 in a three-dimensional structure and can be acquired as a two-dimensional image by the depth sensing unit 220. Plural images of the object 310 are gained and the images are structured by multi-layering to acquire information about a three-dimensional structure of an actual vein.

The following embodiments are based on the premise of the two-dimensional vein image 320 and the embodiments can be applied to a three-dimensional vein structure information in an allowable application range. Further, the infrared luminescent unit 210 is configured to emit a light having a frequency in an infrared wavelength region. When the object 310 is located in a proper position with respect to the infrared luminescent unit 210, the light reaches the object 310 and is reflected.

In this instance, the vein 330 of the object 310 absorbs light in the infrared wavelength region, especially, a near infrared (NIR) wavelength region. Accordingly, when the light reaching the object 310 after being emitted from the infrared luminescent unit 210 is in the infrared wavelength region, much of the vein 330 area is absorbed without being reflected and the other area is not absorbed to be reflected.

The light reflected on the object 310 can reach the depth sensing unit 220 functioning as the image sensor. In other words, the reflected light is focused on the depth sensing unit 200 to form an image. The other area except the vein 330 has a high reflectivity to form a bright area of the vein image 320 and the vein 330 forms a dark area of the vein image 320.

Figure 4:
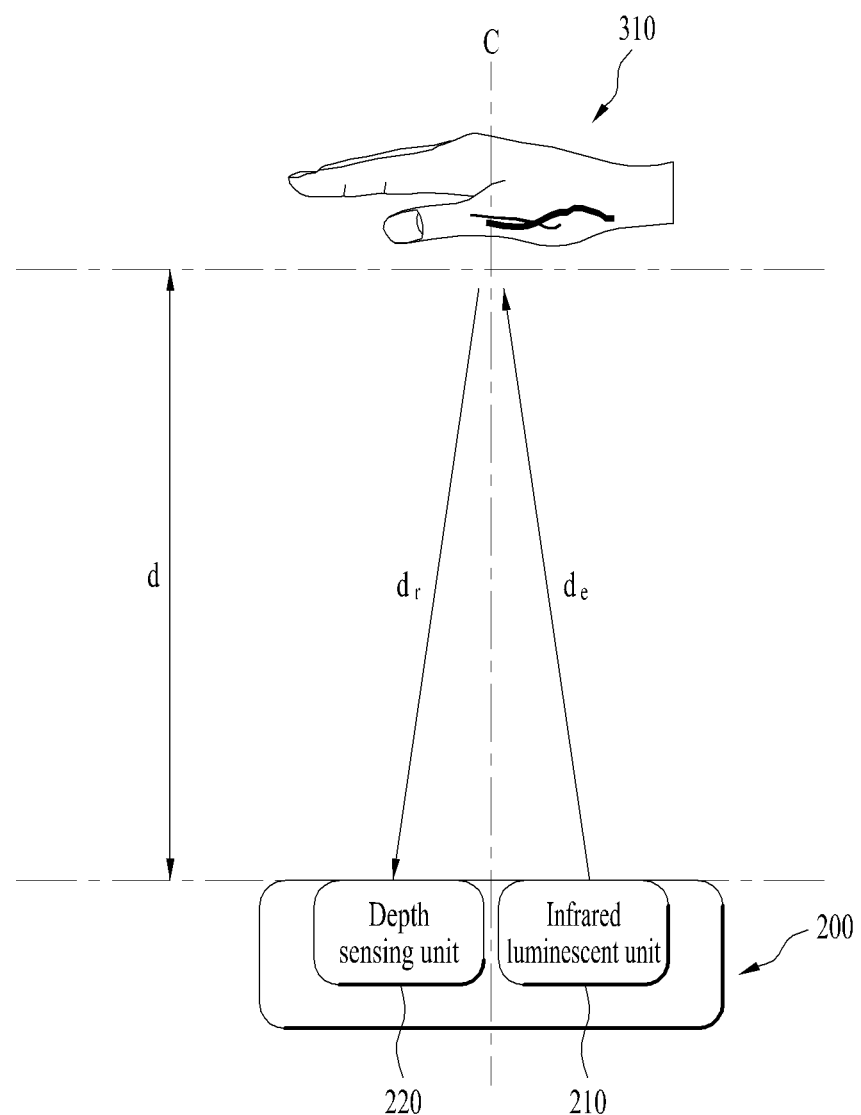
FIG. 4 is a conceptual diagram illustrating an object and a biometric authentication device.
Figure 5:
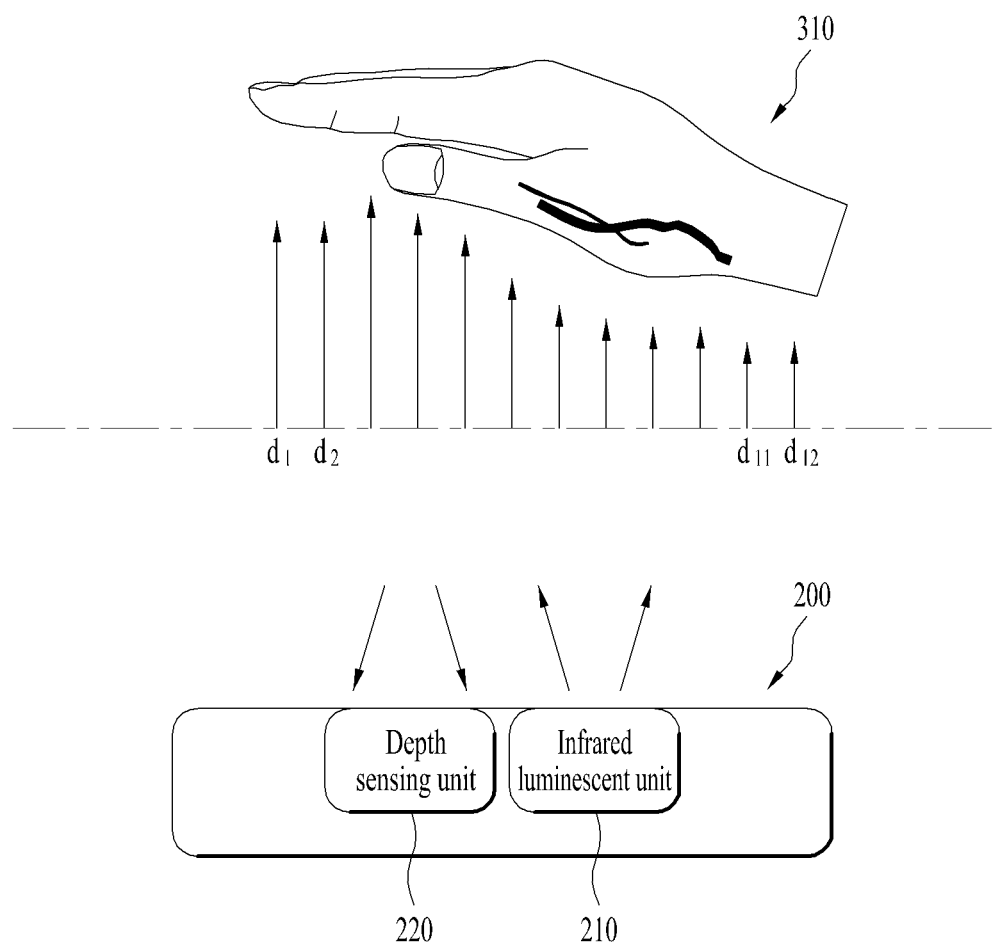
FIG. 5 is another conceptual diagram illustrating the object and the biometric authentication device associated with the present disclosure.

Next, FIGS. 4 and 5 are conceptual diagrams illustrating the object 310 and the biometric authentication device 100. As shown, the depth sensor 200 can measure a distance value and a depth value of the objects 310. In particular, the distance value of the object 310 means an approximate distance from the depth sensor 200 to the object 310. In addition, the depth value of the object 310 means the exact distance to each point of the object 310. When the object 310 stands still, the distance value of the object 310 may have a single value and the depth value of the object 310 may have more than two values.

Further, the depth sensor 200 can be realized into a TOF (Time Of Flight) sensing type, a stereo camera type, a structured light type and a conventional camera type. When the depth sensor 200 is realized as the TOF sensing type, the accuracy of the vein is high and the calculation speed is sufficiently guaranteed.

Next, a method for measuring the distance value and depth value of the sensor 200 realized as the TOF sensing type will be described. In particular, the depth sensing unit 220 can calculate the distance value of the object 310 based on information about the light reaching the depth sensing unit 220 after being emitted from the infrared luminescent unit 210. As shown in FIG. 4, the distance value of the object 310 means a distance (d) from the depth sensor 200 to the object 310, which may be equal to a distance (dr) from the depth sensing unit 220 to the object 310 configured to be photographed or a distance (de) from the infrared luminescent unit 210 to the object 310 to be photographed.

At this time, the depth sensor 200 means a configuration in which the infrared luminescent unit 210 and the depth sensing unit 220 are mounted. Accordingly, the exact meaning of the distance value of the object 310 may be the distance from a light-emitting surface of the depth sensor 200 to a light reflecting surface of the object 310. The light emitted from the infrared luminescent unit 210 is reflected on the object 310 to reach the depth sensing unit 220. The depth sensing unit 220 can measure the travelling time of the light emitted from the infrared luminescent unit 210 to the depth sensing unit 220 and calculate the distance value to the object 310 based on the measured time.

In addition, the infrared luminescent unit 210 can emit a light which is modulated into a specific frequency (f) and sense the light returning thereto after being reflected on the object 310. In this instance, the modulated light may be a pulse wave or CW (Continuous-Wave). Further, the depth sensing unit 220 can sense phase change with the travelling time of the light to the object 310 therefrom and calculate the distance to the object 310. The distance value (d) of the object 310 is as follows:

$$d = \frac{c}{2f}\left(n + \frac{\theta}{2\pi}\right)$$

'c' refers to the velocity of light and 'f' refers to the frequency of light. 'n' refers to a constant which is generated when a phase period is repeated and 'θ' refers to the phase of the received light.

More specifically, the distance (de) from the infrared luminescent unit 210 to the object 310 could be different from the distance (dr) from the depth sensing unit 220 to the object 310. When the infrared luminescent unit 210 and the depth sensing unit 220 are arranged adjacent to each other, the distance between the infrared luminescent unit 210 and the depth sensing unit 220 is much narrower than $d_e$ or $d_r$, and accordingly, it can be said that de and $d_r$ are equal to each other.

Based on the premise that the infrared luminescent unit 210 and the depth sensing unit 220 are adjacent to each other, while the object 310 is located near a central line (C) of the two elements, a vertical distance (d) may be equal to the distance ($d_r$) from the object 310 to the depth sensing unit 220. By extension, if the maximum value of the distance (d) is fixed, 'n' may be zero in the above-noted formula and the above-noted formula may be simplified as follows:

$$d = \frac{c\theta}{4\pi f}$$

The light phase of 'θ' can be gained by using data about the pixel intensity sensed by the depth sensing unit 220.

Next, FIG. 5 is another conceptual diagram illustrating the object 310 and the biometric authentication device 100 associated with the present disclosure. The light emitted from the infrared luminescent unit 210 substantially reaches and reflects not one point but a preset area of the object 310. Accordingly, a plurality of distances to the preset area of the object 310 can be calculated.

For conceptual division, the distances from plural points of the predetermined area of the object 310 may be defined as depth values of the object 310, respectively. In particular, FIG. 5 schematically illustrates d1 through d12. However, more values can be calculated at more specific intervals. In addition, the distance value (d) to the object 310 is a representative value or an average value of the depth values such that the distance value (d) may correspond to the approximate distance from the depth sensor 200 to the object 310.

The calculated depth value of the object 310 can facilitate the shape of the preset area of the object 310 to be anticipated such that a tilt state of the object 310, in other words, an angle value of the object 310 can be anticipated. In particular, the angle value of the object 310 means a relative angle of the object 310 with respect to the depth sensor 200 and it can be expressed as Yaw rotation, Pitch rotation or Roll rotation elements. This can be realized by the depth value and the analysis of the vein image.

Figure 6:
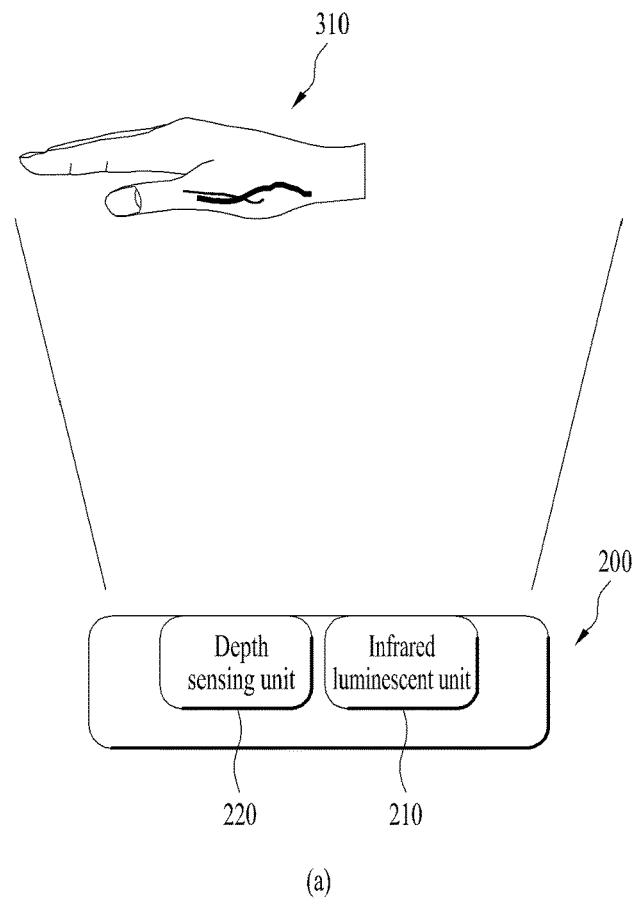
FIGS. 6 and 7 are conceptual diagrams illustrating one embodiment of the vein image and the biometric authentication device.
Figure 6:
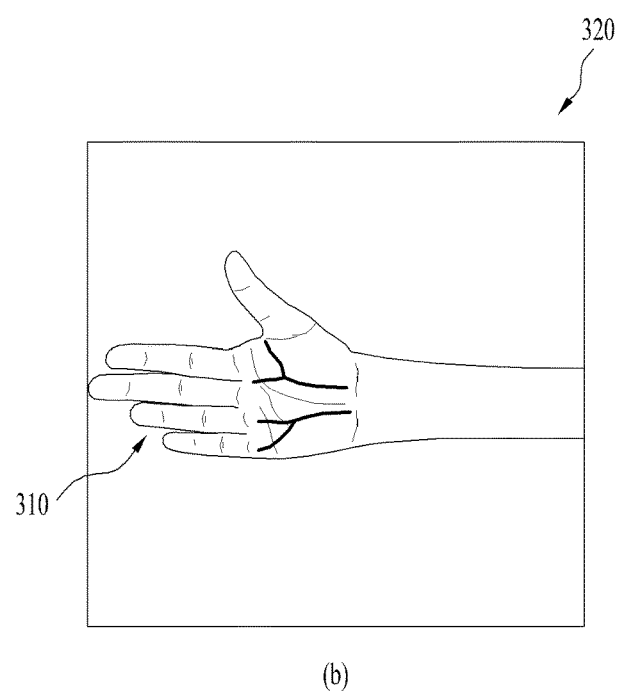
Figure 7:
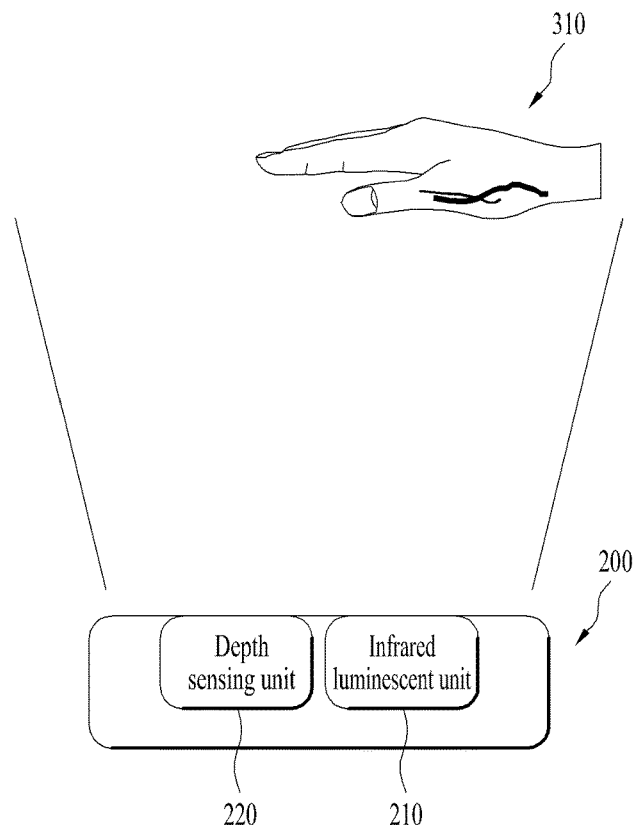
Figure 7:
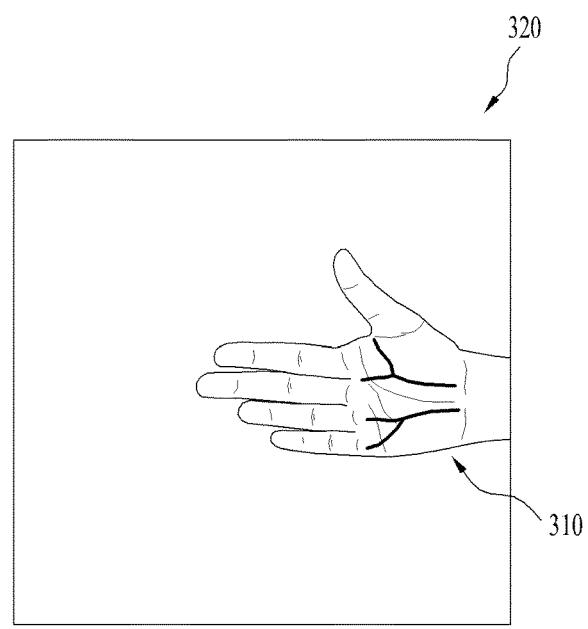

Next, FIGS. 6 and 7 are conceptual diagrams illustrating one embodiment of the vein image 320 and the biometric authentication device 100. The biometric authentication device 100 can determine a horizontal position of the object 310 based on the vein image 320 acquired by the depth sensing unit 220. The horizontal position means a position on one horizontal surface with respect to the direction oriented by the depth sensor 200 and it can be defined as the horizontal surface for easy explanation sake.

The horizontal position of the object 310 can also be expressed as a coordinate on the vein image 320. For example, the horizontal position of the object 310 can be determined according to the position of the object 310 on the acquired vein image 320. When the depth sensing unit 220 acquires the vein image 320 from the object 310 located in the horizontal position shown in FIG. 6 (*a*), a vein image 320 shown in FIG. 6 (*b*) can be obtained. When a vein image 320 is acquired from the object 310 located in a horizontal position shown in FIG. 7 (*a*), a vein image 320 shown in FIG. 7 (*b*) can be obtained.

The arithmetic unit 240 can perform a reverse operation to calculate that the horizontal position of the object 310 is as shown in FIG. 6 (*a*) based on the vein image 320 shown in FIG. 6 (*b*) or expect that the horizontal position of the object 310 is as shown in FIG. 7 (*a*) based on the vein image 320 shown in FIG. 7 (*b*).

Figure 8:
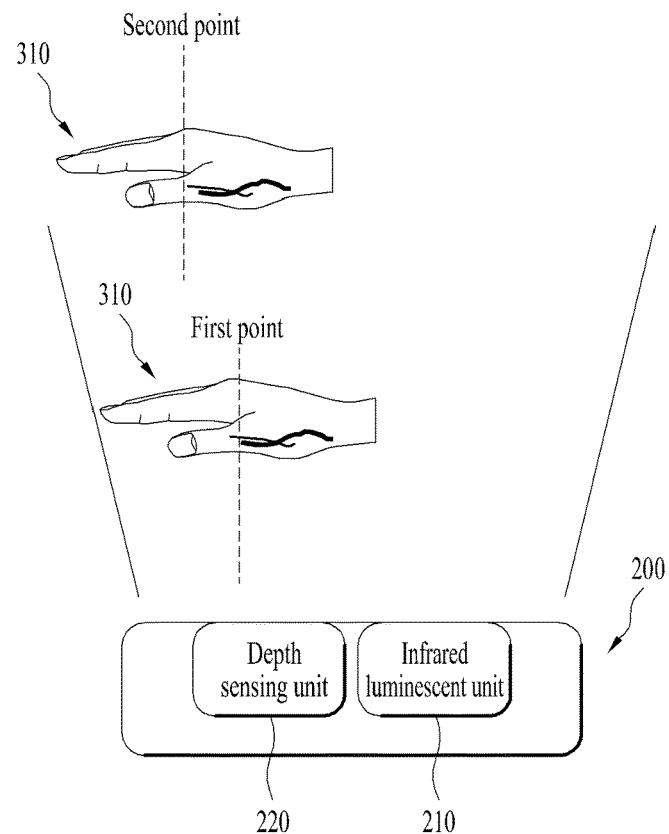
FIG. 8 is a conceptual diagram illustrating one embodiment of the vein image and the biometric authentication device.
Figure 8:
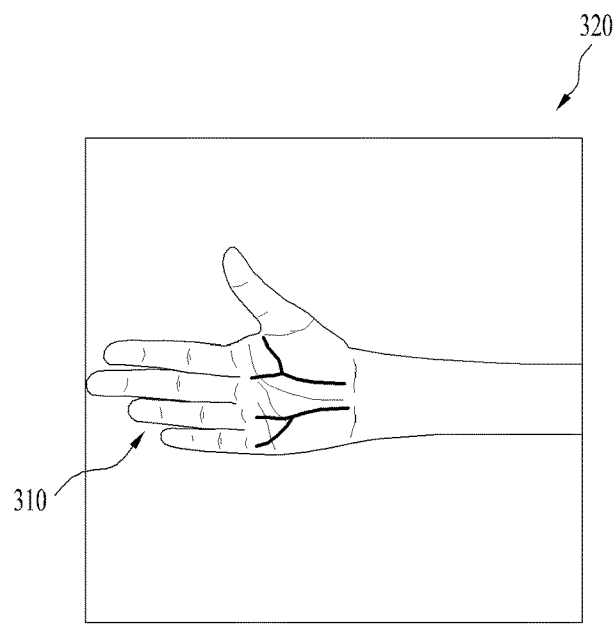

Next, FIG. 8 is a conceptual diagram illustrating one embodiment of the vein image 320 and the biometric authentication device 100. When the object 310 is located in a first point and a second point in FIG. 8 (*a*), which means that the horizontal positions of the object 310 are different, one single vein image 320 at the same position can be gained due to a view angle of the depth sensor 200 such that there might be a concern that the first point and the second point are recognized as the same horizontal position. Accordingly, it is preferable to put the view angle of the depth sensor 200 into consideration.

For example, the arithmetic unit 240 can calculate the horizontal width according to the distance value of the object 310 based on the view angle and determine the horizontal position of the object 310 based on the vein image 320 gained after considering the calculated horizontal width.

Figure 9:
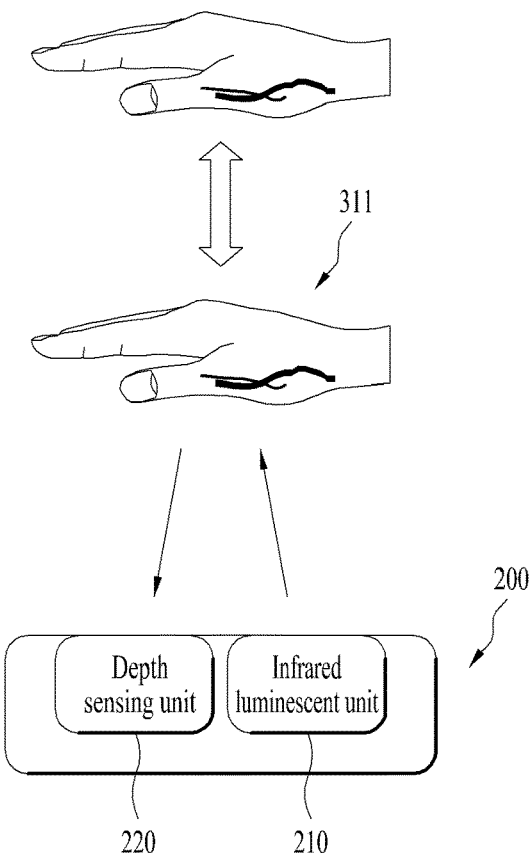
FIG. 9 is a diagram schematically illustrating a process of biometric information registration.

Next, FIG. 9 is a diagram schematically illustrating a process of biometric information registration. To perform the biometric authentication, a biometric information registration process has to be preceded. For easy understanding, the object 310 provided as the sensing object in the registration process may be defined as a first object 311 and the object 310 provided as the sensing object in the authentication process may be defined as a second object 312. In other words, the first object 311 means the registration object and the second object 312 means the authentication object.

The biometric authentication device 100 can induce the user to locate the first object 311 at different distances to acquire a vein image at each of the distances. While the first object 311 is being located at different distances, the infrared luminescent unit 210 can emit light several times and the depth sensing unit 220 can calculate distance values of the first object at different distances, respectively, to acquire vein images of the first object 311 according to the distance values, respectively.

The method for calculating the distance value of the first object 311 and the method for acquiring the vein image are as mentioned above. The biometric information including the vein image acquired by the depth sensing unit 220 and the calculated distance value of the first object 311 can be stored in the memory 170 as registration information. The registration information can be compared with the biometric information of the second object in the following authentication process.

Figure 10:
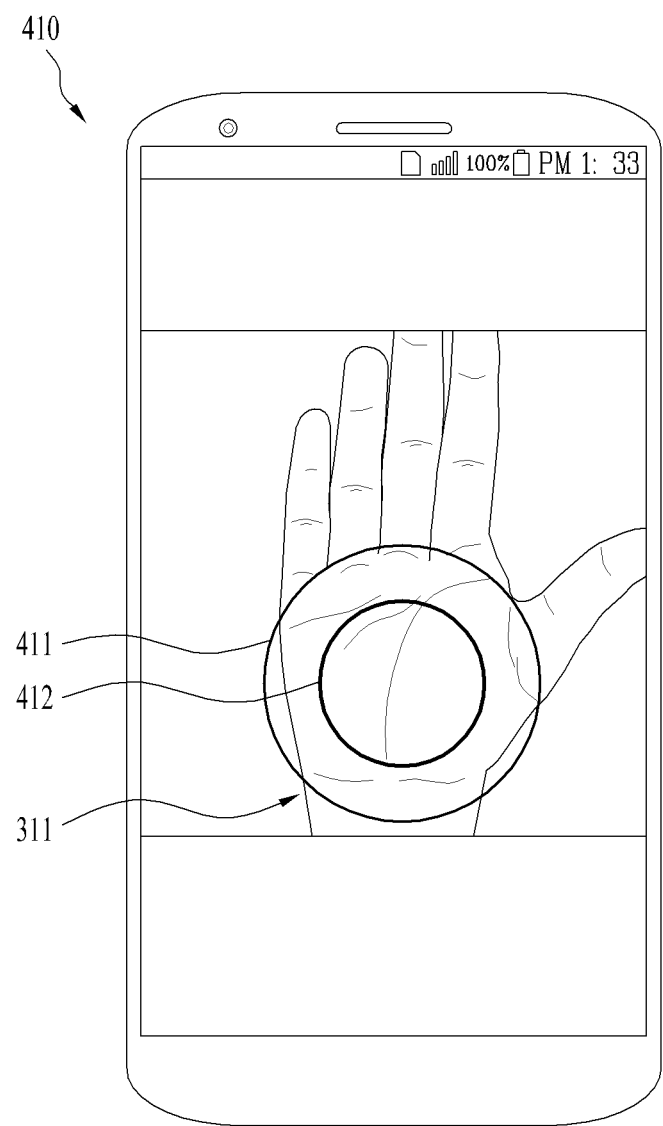
FIG. 10 is a diagram illustrating a display of the biometric authentication device.

Next, FIG. 10 is a diagram illustrating a display 410 of the biometric authentication device 100. As mentioned above, the biometric authentication device 100 can induce the user to move the first object 311 so as to gain a vein image at a target position or angle. The position means a vertical position (distance value) and a horizontal position of the object 310.

As one example, the vein image acquired by the depth sensor 200 can be output on the display 410 as preview in the registration process. The controller 180 can control the display unit 151 to output a Region Of Interest (ROI) indicator 411 and a guide indicator 412 on the display 410. In this instance, the position and angle values of the first object 311 output as the preview may be reflected in the ROI indicator 411. The guide indicator 412 can indicate the target position and angle values of the first object 311.

Further, the ROI indicator 411 and the guide indicator 412 may be the indicators for a specific area of the object 310. For example, the ROI indicator 411 can display a border area of the palm in the hand except the fingers and the guide indicator 412 can display an area in which a border of the palm except the fingers has to be located.

In addition, the user can locate the first object 311 in a specific position to match the ROI indicator 411 with the guide indicator 412. The ROI indicator 411 is configured to represent all of the distance value (vertical position), horizontal position and angle value of the first object 311. Accordingly, the first object can be located at the target distance, horizontal position and angle values by matching the ROI indicator 411 with the guide indicator 412.

When it is targeted to acquire the vein image of the first object 311 corresponding to the first distance, the controller 180 can output the guide indicator 412 corresponding to the first distance on the display 151. The controller 180 can control to repeat the above-noted process several times, only to acquire the vein images of the first object 311 according to several distances. Once the depth sensing unit 220 acquires the vein image of the first object 311 located at the first distance, the controller 180 can control the display unit 151 to display a changed guide indicator 412 corresponding to a second distance to induce the user to locate the first object 311 at a second distance. After that, when the first object 310 is located at the second distance, the controller 180 can control the depth sensing unit 220 to acquire a vein image gain. Through such the process, the biometric authentication device 100 can gain the plurality of the vein images corresponding to the first distance and the second distance.

The above-noted embodiment shows datafication of the vein images corresponding to the two distances. However, datafication of vein images corresponding to much more distances can be performed. As data of the vein images corresponding to more distances is stored, the more improved the authentication accuracy and velocity may be. When the vein images corresponding to more distances are desired, the controller 180 can control the display 410 to continuously display a changed guide indicator 412.

The above-noted embodiment is one of user guide methods of the biometric authentication device 100 to gain the vein images of the first object 310 according to the plurality of the distances. Accordingly, the user guide method for that can be realized in a different way.

As one example, the controller 180 can induce the user to move the first object 311 by controlling the display unit 151 to display a guide comment of a specific command, and not output the guide indicator 412. Further, the vein images acquired according to the guide method can be matched with the distance values, respectively, to be stored in the memory 170 as registration information. A process of storing the registration information in the memory 170 can be implemented by the control of the controller 180.

Figure 11:
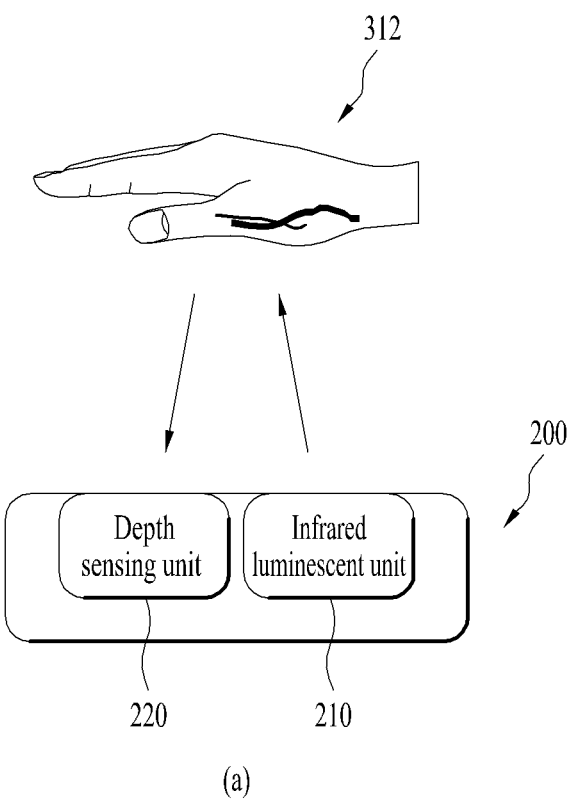
FIG. 11 is a conceptual diagram of a process of vein authentication.

Next, FIG. 11 is a conceptual diagram of a process of vein authentication. In the authentication process, the depth sensing unit 220 can calculate the distance value of the object 310 from the second object 312 according to the above-noted method and acquire a vein image corresponding to the calculated distance.

The infrared luminescent unit 210 can emit the light having an infrared wavelength and the emitted light can be reflected on the second object 312 to be incident on the depth sensing unit 220. The depth sensing unit 220 can calculate the distance value of the second object 312 and acquire a corresponding vein image to the calculated distance value.

In addition, the arithmetic unit 240 can compare the acquired or calculated biometric information about the second object 312 with the registration information stored in the memory 170 and calculate the matching rate between them based on the result of the comparison. When the calculated matching rate is a threshold or more, an authentication signal can be generated.

The authentication process facilitated by the comparison of the biometric information has to include the comparison of the vein images. In other words, one or more vein images used as one requirement for the authentication is required to have the matching rate of the threshold or more. In addition, the calculation of the matching rate for the vein images can be performed by the comparison of the ROI. The vein images may include not only the object 310 but also peripheral regions. The object 310 itself may include vein-irrelative regions (e.g., the finger regions). Further, the ROI may mean the main-regions of the vein image which has many veins in the object 310.

Accordingly, it is preferable that the arithmetic unit 240 calculates the matching rate based on the result of the comparison between the vein image and ROI. The comparison of the vein image or ROI can be determined according to matching of pixel units. In other words, the matching rate can be calculated based on whether the pixel distribution patterns of two vein images are similar to each other. For the pixel comparison of the vein images, the vein images can have a process of reference point matching and a process of size matching.

Figure 12:
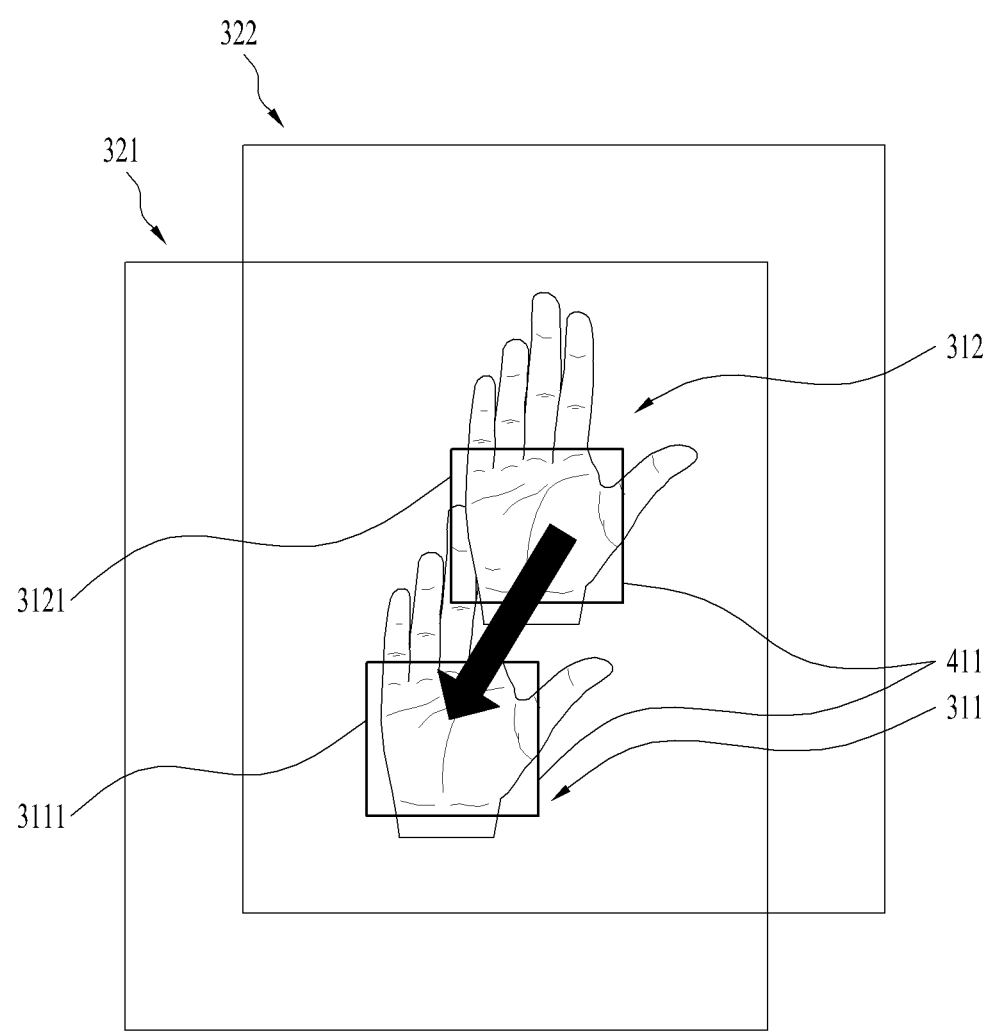
FIG. 12 is a diagram illustrating a process of reference point matching.

Next, FIG. 12 is a diagram illustrating a process of reference point matching. When the ROI 3111 of the vein image 321 for the stored first object 311 is different from the ROI 3121 of the vein image 322 for the second object 312 in horizontal positions, the arithmetic unit 240 can move one of the ROIs 3121 for the first object 310 or the second object 312 so as to compare them with each other. The arithmetic unit 240 can move only the ROI or the entire vein images 321 and 322, for the comparison For the movement, the arithmetic unit 240 can set a reference point for the vein image 321 of the first object 311 and the vein image 322 of the second object 312. For example, a left lower corner of the ROI can be set as the reference point or a center of the palm can be set as the reference point. The arithmetic unit 240 can move the ROI or the vein image to match the reference of the vein image 321 for the first object 311 with that of the vein image 322 for the second object 312.

Figure 13:
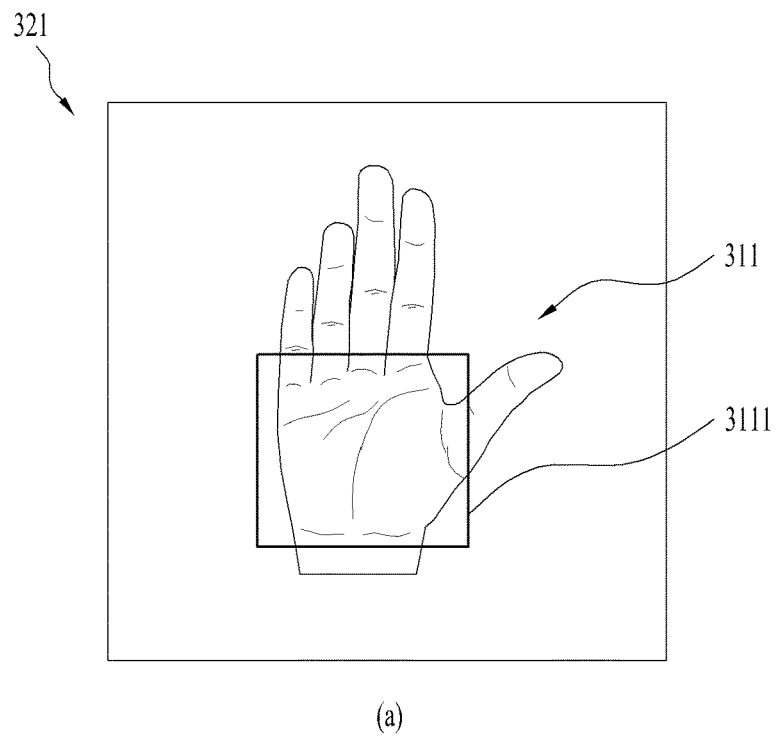
FIG. 13 is a diagram illustrating a process of size matching.
Figure 13:
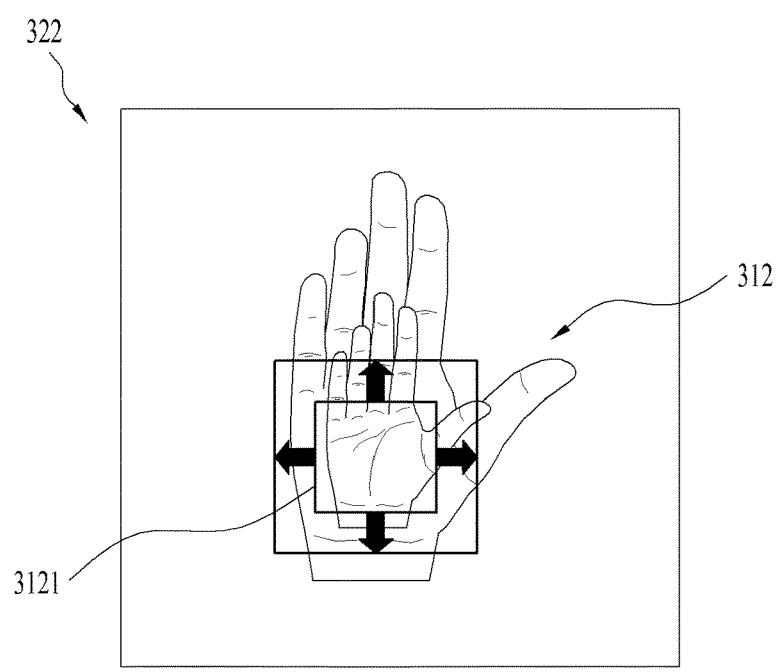

FIG. 13 is a diagram illustrating a process of size matching according to one embodiment. The first object 311 of the stored vein image 321 is different from the second object 312 of the vein image 322 in size, a process is required to match the first object with the second object in size to compare the matching rate.

Further, the arithmetic unit 240 can match the sizes of the ROIs 3111 with each other and 3121 by upsizing or downsizing one of the ROIs 3111 and 3121 and then perform the comparison. Alternatively, the objects 311 and 312 can be matched with each other by upsizing or downsizing the entire vein images 321 and 322 including the ROIs 3111 and 3121 as well as the ROIs 3111 and 3121. The process of matching the size of the object 311 with that of the object 312 can be performed based on the distance value of the first object and the distance value of the second object.

Alternatively, the vein image or the ROI can be gradually upsized or downsized according to a trial & error acquiring method to perform the comparison. Unless noted additionally, the process of matching the reference points or sizes can be equally applicable to the authentication process according to the other embodiments which will be described later.

Next, several examples according to the authentication method will be described. The authentication method can be applicable to the following embodiments independently or combined, considering the security level or the authentication accuracy.

(Embodiment 1)

Figure 14:
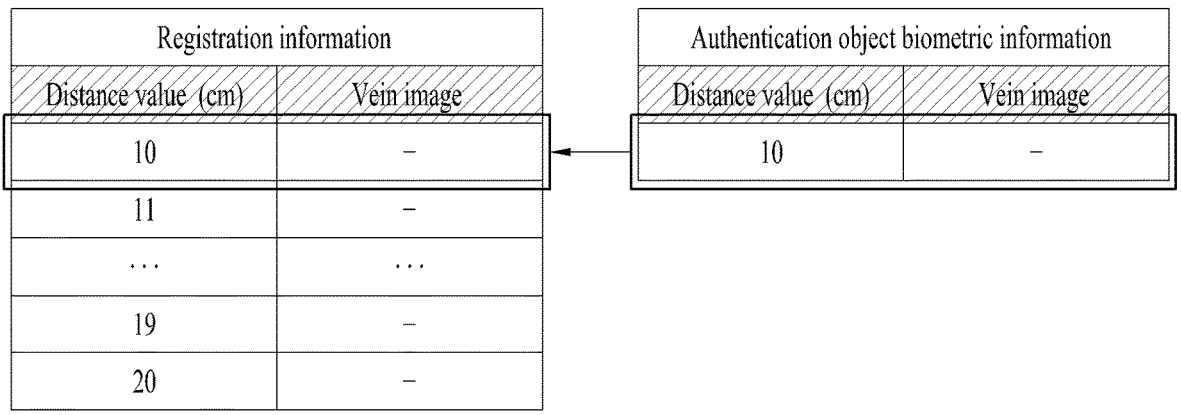
FIGS. 14 and 15 are schematic diagrams illustrating one embodiment of an authentication process performed in the biometric authentication device.
Figure 15:
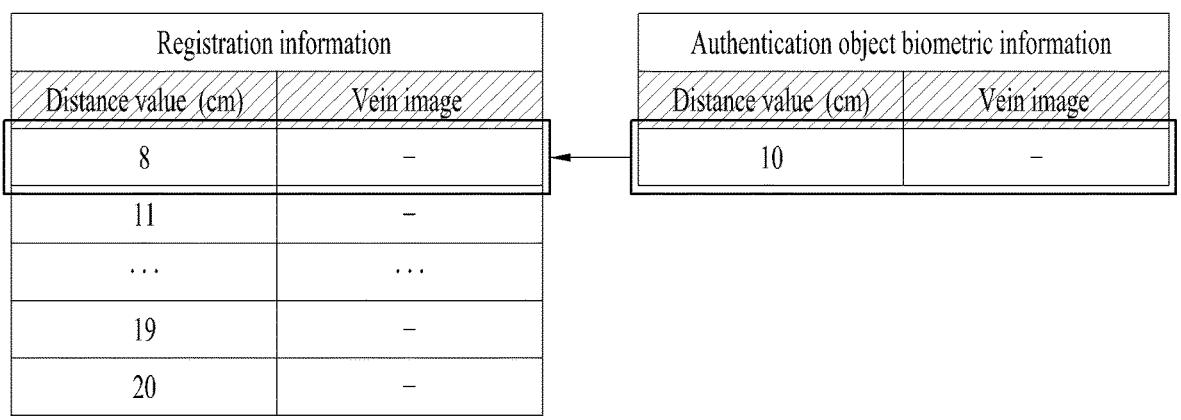

Embodiment 1 relates to an authentication method based on biometric authentication factors. In particular, FIGS. 14 and 15 are schematic diagrams illustrating one embodiment of an authentication process performed in the biometric authentication device.

(Embodiment 1-1)

According to Embodiment 1-1, the vein image of the first object 310 registered as the closest distance value with respect to the second object 312 is compared with the acquired vein image of the second object 312 to perform authentication. When the object 310 is the same, the actual vein image structure may not be variable according to the distance values but the vein structure on the vein image can become different according to the distance of the object 310 by the difference between the resolutions.

Considering that, the vein images located apart the same distance as possible can be compared to minimize the error occurrence probability in calculating the matching rate. Such the method need not perform the comparison between the vein images having different distance values, respectively, such that it can be helpful in quicken the authentication velocity.

For example, when the acquired second object is spaced a distance of 10 cm apart from the depth sensing unit 220 as shown in FIG. 14, the arithmetic unit 240 can compare a vein image corresponding to a corresponding distance value to 10 cm out of the stored registration information about the first object with a vein image of the second object so as to calculate the matching rate.

Unless the corresponding vein image of the first object to the distance value of 10 cm is found in the stored registration information, only when a corresponding vein image of the first object to a distance value of 8 cm or 11 cm, the arithmetic unit 240 can compare the vein image of the first object corresponding to the distance value of 11 cm which is the closest to 10 cm with the vein image of the second object so as to calculate the matching rate.

In Embodiment 1-1, the vein images having the same or closest distance values are compared with each other such that the objects or ROIs of the vein images may be the same. Accordingly, the process of matching the sizes of the vein images mentioned above, referring to FIG. 13 will be omitted advantageously.

Figure 16:
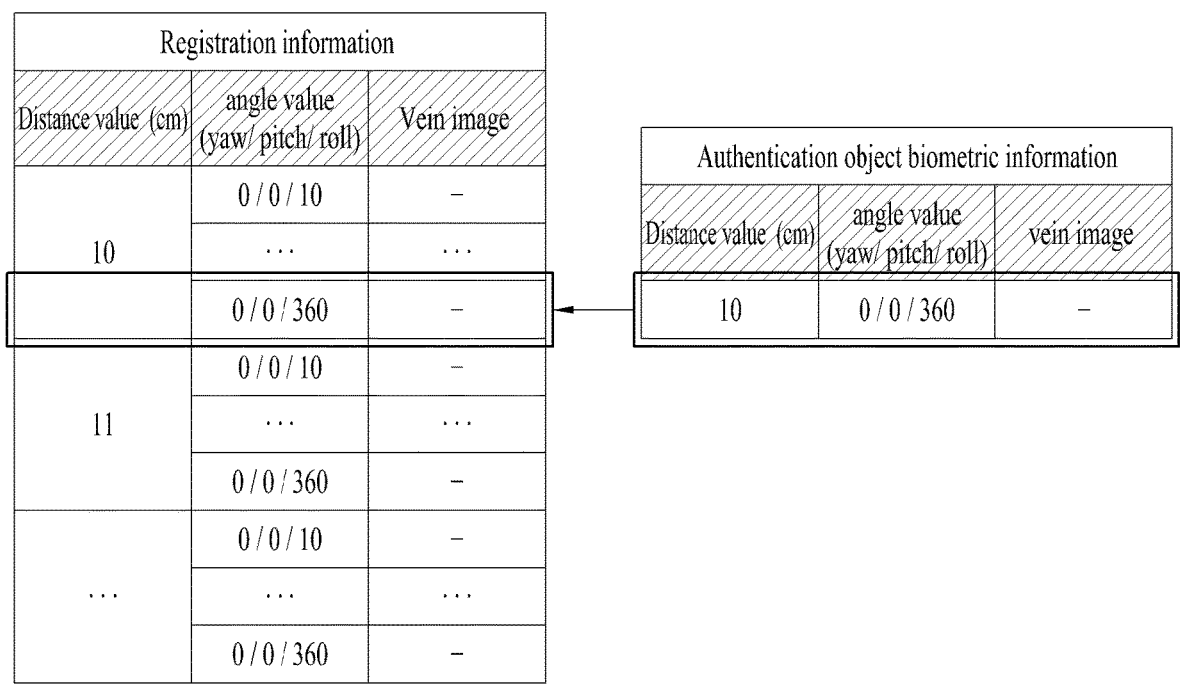
FIG. 16 is a schematic diagram illustrating another embodiment of the authentication process performed in the biometric authentication device.

FIG. 16 is a schematic diagram illustrating another embodiment of the authentication process performed in the biometric authentication device.

Embodiment (1-2)

Leading on from Embodiment 1-1, the arithmetic unit 240 can compare the vein images with each other, even considering the angle values of the objects. Even the same objects located at the same positions may have different vein images according to the angle values. Accordingly, the angle value can be provided in the registration information and the biometric information of the second object to be reflected in the matching rate.

Without such process, the registration and authentication processes can require the user to locate the object at a specific angle, which is inconvenient. Accordingly, during the registration process, the controller 180 can acquire not only the plurality of the distance values but also vein images of the object 310 according to the plurality of the angle values and store the acquired values in the memory 170. In other words, the registration information includes one vein image corresponding to a specific distance value and a specific angle value.

In the registration process, the controller 180 can control the display unit 151 to move the first object 310 at a plurality of angles or distances and control the depth sensing unit 222 to acquire a plurality of vein images according to the angle values and distance values of the first object 310. In the authentication process, the depth sensing unit 220 can calculate all of the distance and angle values of the second object 312. The arithmetic unit 240 can compare a corresponding vein image of the first object 310 to the calculated distance and angle values of the second object 312 with a vein image of the second object 312, only to calculate the matching rate.

(Embodiment 2)

In Embodiment 2, concept of time is further provided as one of the authentication.

(Embodiment 2-1)

An unintended authentication process may be performed once the above-noted authentication requirements are satisfied, while the user is doing other things. To prevent that situation, the arithmetic unit 240 can generate an authentication signal only when the time period in which the matching rate is the threshold or more is satisfied over a preset range or more. When such the requirement is further provided, the user has to perform the authentication process by keeping the action of fixing the object at the specific position or angle for a preset time period or more. The features of Embodiment 2-1 may be additionally applicable to all of the above-noted Embodiment 1.

(Embodiment 2-2)

Figure 17:
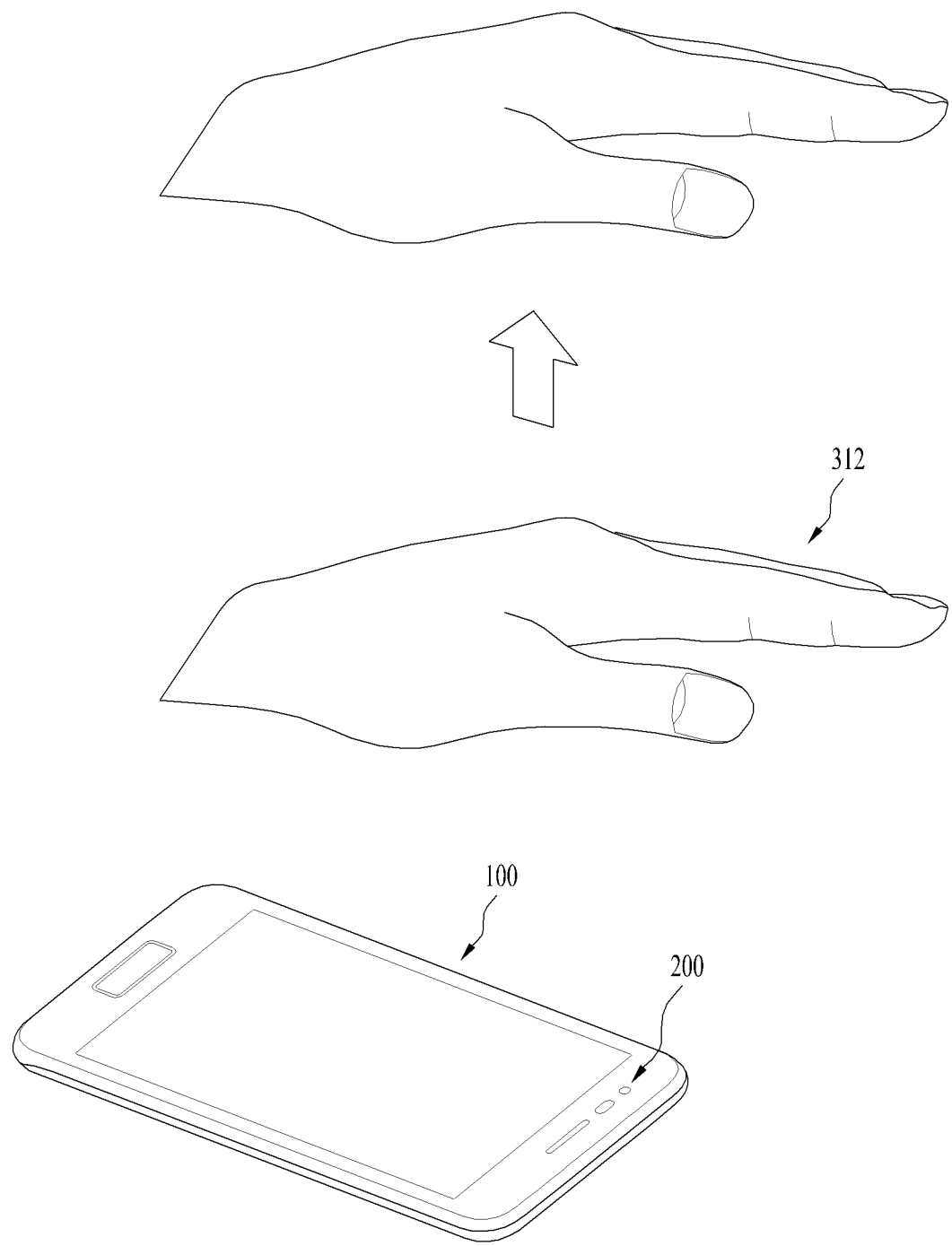
FIG. 17 is a schematic diagram illustrating a further embodiment of the authentication process performed in the biometric authentication device.

Different from Embodiment 2-1 requiring the fixed state, Embodiment 2-2 can add a state change of the object as the authentication requirement. In particular, FIG. 17 is a schematic diagram illustrating a further embodiment of the authentication process performed in the biometric authentication device.

(Embodiment 2-2-1)

The registration information can include distance pattern information. The distance pattern information can include change directions, change amount or change velocity of the object distance value. The infrared luminescent unit 210 can emit light several times and determine a distance change of the second object 312. When the distance change of the second object 312 matches the distance pattern information of the registration information, the authentication signal can be generated.

For example, when the distance pattern information has a distance of 10 cm from the depth sensor 200 as a first requirement point and a distance of 20 cm from the depth sensor 200 as a second requirement point, the second object 312 can move in a direction which becomes farther from the depth sensor 200 and pass the first requirement point of 10 cm and the second requirement point of 20 cm. After that, it can be said that the distance value change of the second object matches the distance pattern information of the registration information.

Figure 18:
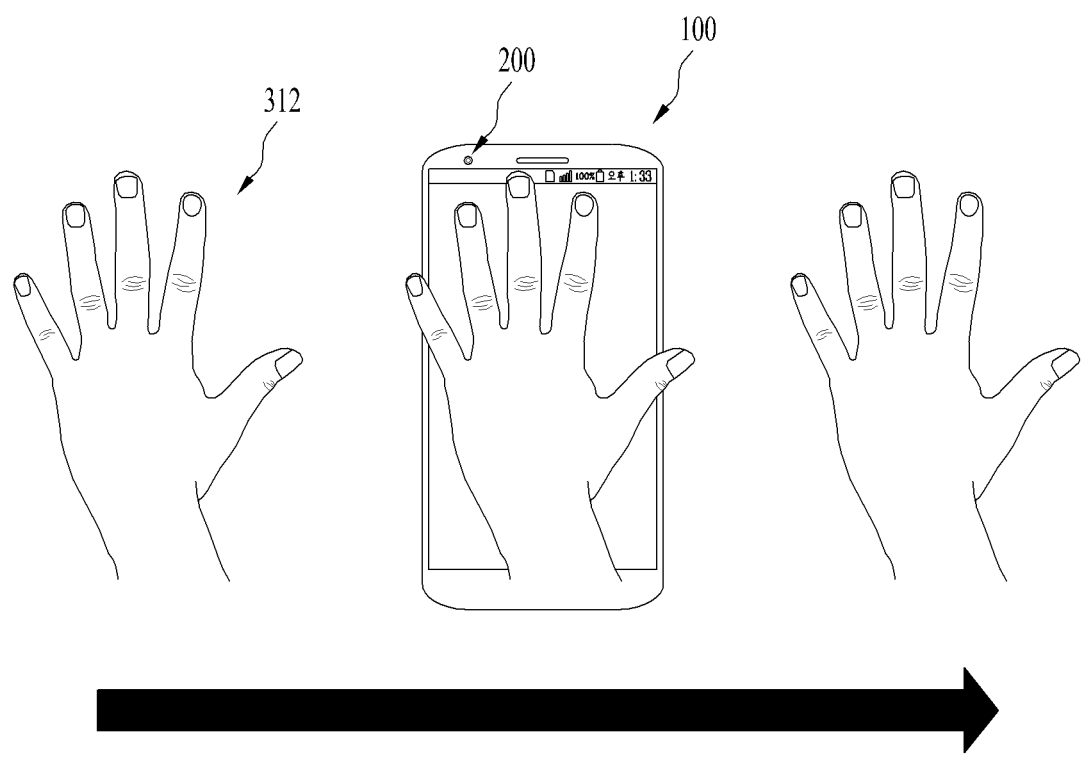
FIG. 18 is a schematic diagram illustrating a further embodiment of the authentication process performed in the biometric authentication device.

FIG. 18 is a schematic diagram illustrating a further embodiment of the authentication process performed in the biometric authentication device.

(Embodiment 2-2-2)

Similar to Embodiment 2-2-1, the horizontal change of the object can be added as the authentication requirement. For that, the registration information can include horizontal pattern information. The horizontal pattern information can include position change, change amount and change velocity in the horizontal direction of the object.

The infrared luminescent unit 210 can emit light several times and figure out the horizontal movement change of the second object 312. When the horizontal movement change of the second object 312 matches the horizontal pattern information of the registration information, the authentication signal can be generated. Specific examples can be understood through Embodiment 2-2-1 and omitted accordingly.

Figure 19:
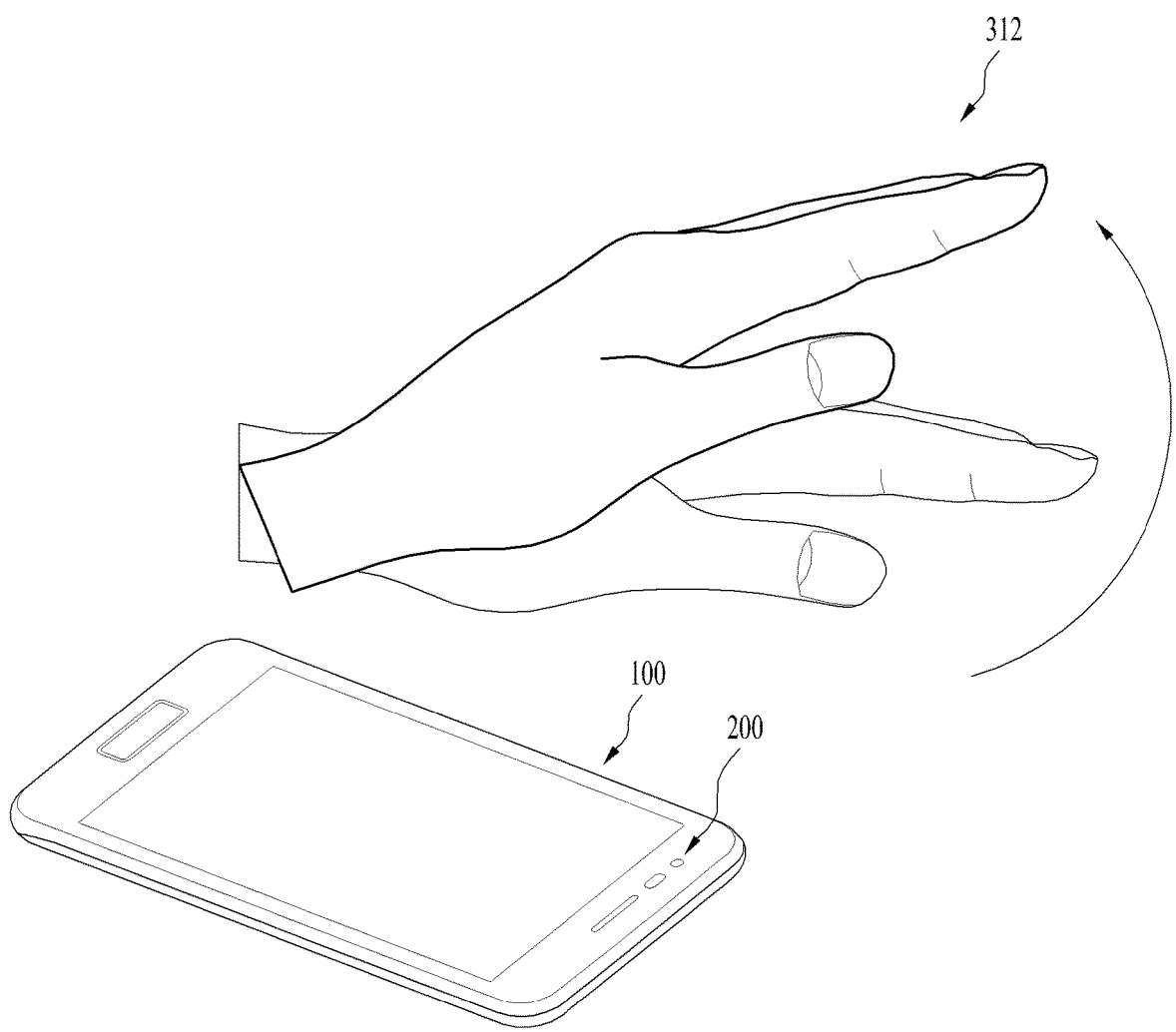
FIG. 19 is a schematic diagram illustrating a still further embodiment of the authentication process performed in the biometric authentication device.

FIG. 19 is a schematic diagram illustrating a still further embodiment of the authentication process performed in the biometric authentication device 100.

(Embodiment 2-2-3)

Similar to Embodiment 2-2-1 and Embodiment 2-2-2, Embodiment 2-2-3 can add angle change of the object as the authentication requirement. For that, the registration information can include angle pattern information. The angle pattern information may include angle change, change amount and change velocity of the object.

The infrared luminescent unit 210 can emit light several times and figure out the angle change of the second object 312. When the angle change of the second object 312 matches the angle pattern information of the registration information, the authentication signal can be generated.

Specific examples can be understood through Embodiment 2-2-1 or Embodiment 2-2-2 and omitted accordingly. At least two of Embodiments 2-2 can be combined. In other words, only when each of the requirements is satisfied, it is calculated to match the patterns with each other and more complex authentication requirements can be formed.

(Embodiment 3)

Embodiment 3 relates to a method of calculating the biometric information and the matching rate of the second object, even when one vein image is acquired as the registration information.

(Embodiment 3-1)

Figure 20:
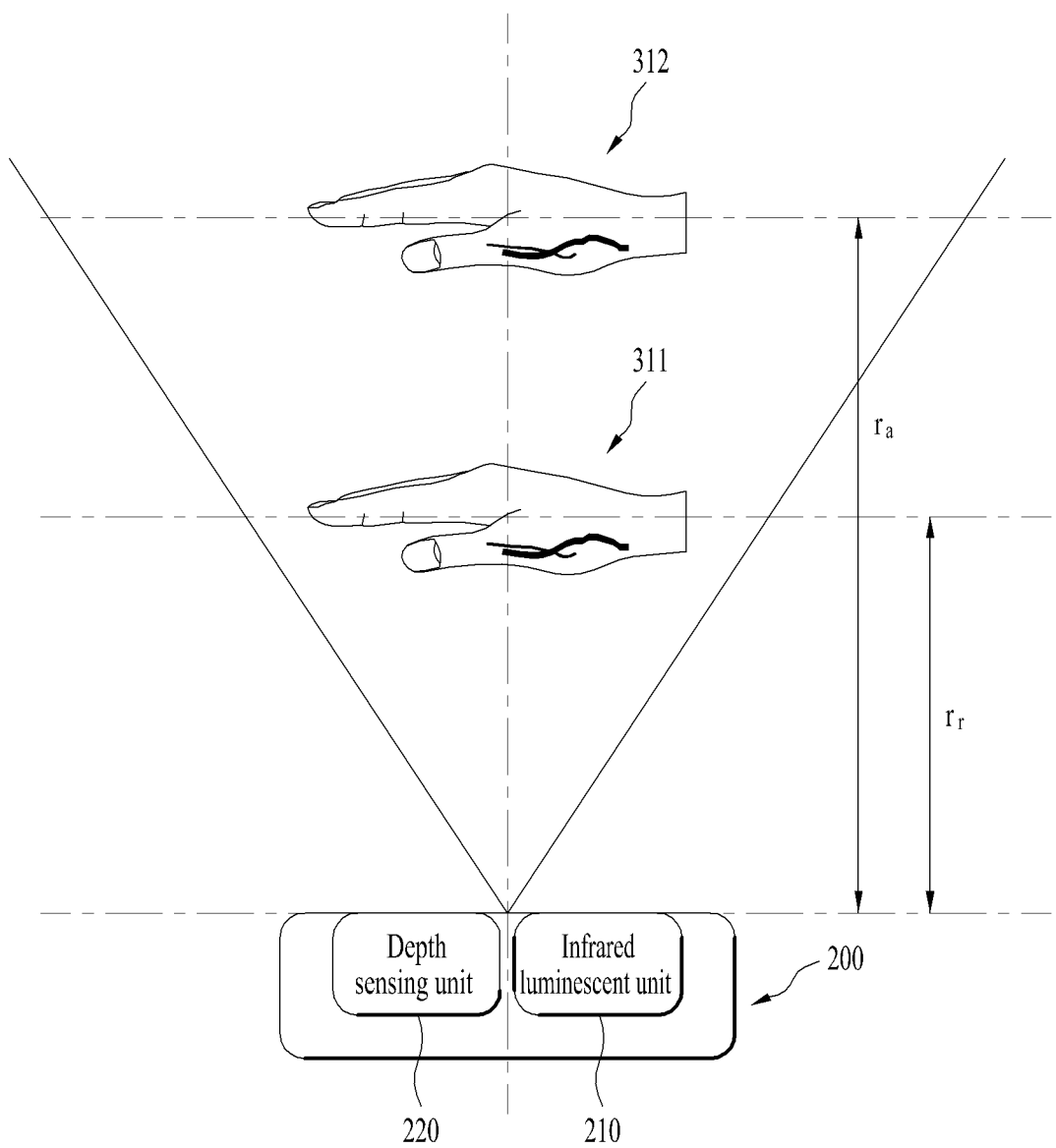
FIG. 20 is a schematic diagram illustrating a further embodiment of the authentication process performed in the biometric authentication device.

FIG. 20 is a schematic diagram illustrating a further embodiment of the authentication process performed in the biometric authentication device. Embodiment 1 is effective when the resolution of the depth sensor is insufficient or the processing speed of the arithmetic unit or controller is slow. However, Embodiment 1 has a disadvantage that a plurality of vein images for the object according to distances and angles have to be acquired.

Accordingly, when the resolution of the depth sensor is sufficient or the processing speed of the arithmetic unit or controller is fast, the matching rate can be calculated even without acquiring the vein images according to the distance values like Embodiment 1. More specifically, even when the distance value of the first object stored as the registration information is different from the acquired distance value of the second object, the vein images can be compared with each other.

In the registration process, the depth sensing unit can acquire one vein image corresponding to one distance value or vein images corresponding to the minimum number of distance values and the controller can store the calculated distance value and the acquired vein images in the memory as the registration information. Hence, in the authentication process, the arithmetic unit can compare the vein images with each other even when the calculated distance value of the second object is different from the distance value of the first object, the arithmetic unit can compare the vein images with each other and calculate the matching rate.

Different from Embodiment 1, it is not necessary to find the distance value which is equal or close to the acquired distance value of the registration information so as to compare in this embodiment. The reference matching process and the size matching process have to be performed, because the vein images are matched with each other by the sufficient resolution. The process of matching the vein images or the ROI sizes with each other is equal to the process shown in FIG. 13.

For example, for easy calculation, based on the premise that the first object 311 and the second object 312 are located in a direction in front of the depth sensor 200 and the width of the view angle at the depth sensor 200 can start from zero, the ratio of second object size to the first object size on the vein image is proportional to the square of the ratio of the distance value (rl) of the first object 311 to the distance value (ra) of the second object 312.

Accordingly, when the distance value of the second object 312 is twice as large as the distance value of the first object 311, the size of the first object 311 becomes four times as large as that of the second object 312 on the vein image so as to upsize the vein image of the second object 312 by four times or downsize the vein image of the first object 311 by four times.

(Embodiment 3-2)

Figure 21:
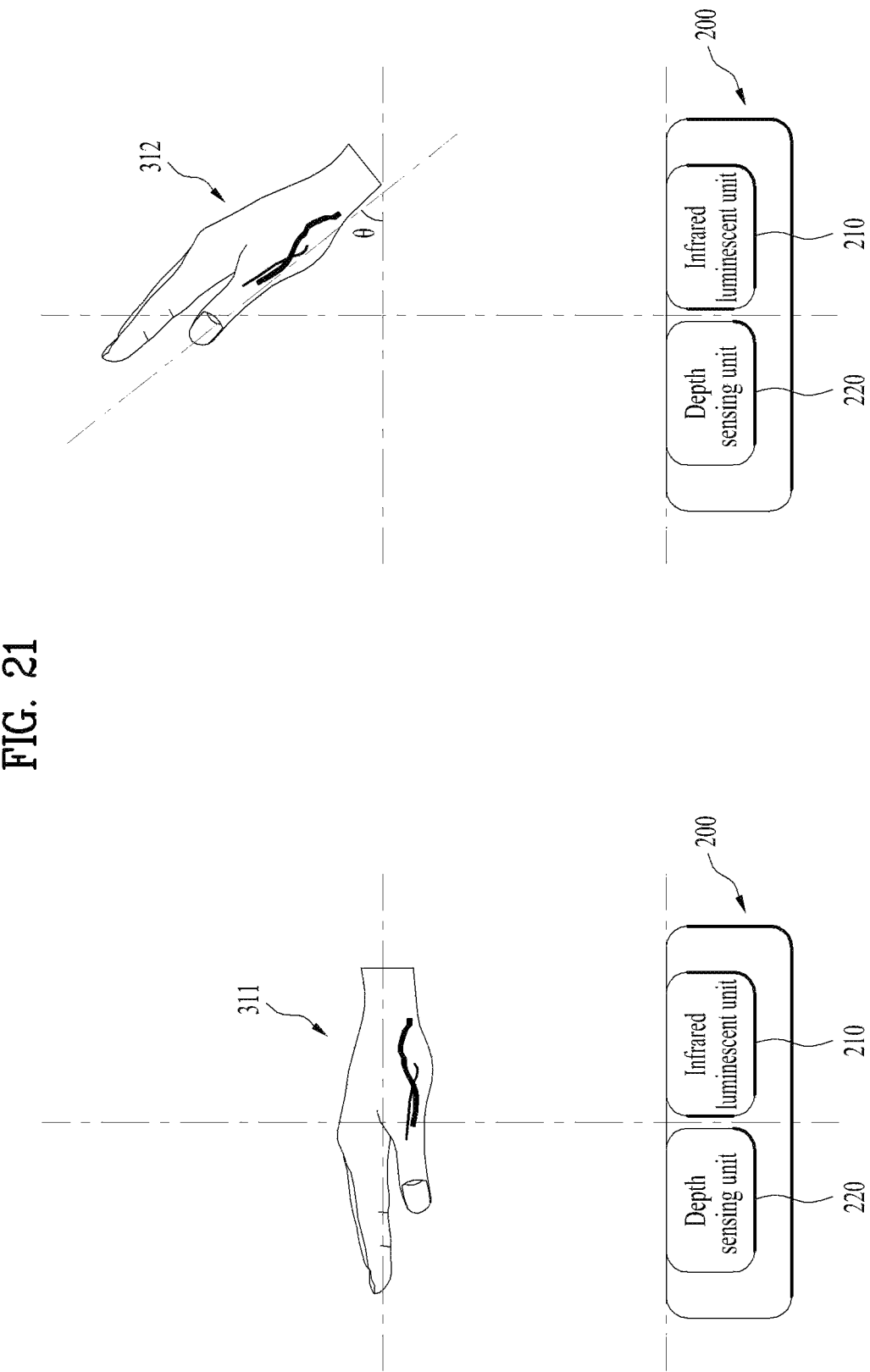
FIG. 21 is a schematic diagram illustrating a further embodiment of the authentication process performed in the biometric authentication device.

FIG. 21 is a schematic diagram illustrating a further embodiment of the authentication process performed in the biometric authentication device. To a similar purpose, in other words, when the angle value of the first object which is stored as the registration information is different from the acquired angle value of the second object, the vein images can be compared after the different angle values are reflected.

More specifically, when the resolution and the processing speed are sufficient, the depth sensing unit can acquire only one corresponding vein image to the single angle value or corresponding vein images to the minimum number of the angle values and the controller can control the calculated angle value and the acquired vein image(s) in the memory as the registration information. After that, the arithmetic unit can have the angle matching process in the authentication process.

First of all, the arithmetic unit can calculate the angles values of the first and second objects. Based on a difference between the angle values of the two objects, one of the vein images can be projected on the other one. When the difference between the angle values of the two objects is θ, one larger one of the vein images is projected on the other one by cos θ and the two vein images are compared.

For example, when the angle value of the first object 311 is 0° and the angle value of the second object 312 is 60°, the arithmetic unit 240 projects the vein image of the first object 311 on a flat surface by cos 60°. Hence, the arithmetic unit 240 can compare the projected vein image of the first object 311 with the vein image of the second object 312. The size matching process and the size matching process may be combined. By extension, the processes may be applied to the above-noted embodiments in an allowable range.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A biometric authentication device comprising:
an infrared luminescent unit configured to emit infrared light with an infrared wavelength;
a depth sensing unit configured to receive the infrared light reflected on a vein of an object placed within a preset distance of the depth sensing unit; and
a controller configured to:
control the depth sensing unit to obtain a first vein image of a first object and calculate a first distance value corresponding to a first distance between the depth sensing unit and the first object, and
store the first vein image and the first distance value in a memory as registration information,
wherein the controller is further configured to:
control the depth sensing unit to obtain a second vein image of the first object and calculate a second distance value corresponding to a second distance different than the first distance between the depth sensing unit and the first object, and
store the second vein image and the second distance value of the first object in the memory as the registration information, and
wherein the controller is further configured to:
control the depth sensing unit to obtain a vein image of a second object and calculate a distance value corresponding to a distance between the depth sensing unit and the second object,
calculate a matching rate by comparing the vein image of the second object with the first vein image of the first object when the distance value of the second object is closer to the first distance value of the first object, and comparing the vein image of the second object with the second vein image of the first object when the distance value of the second object is closer to the second distance value of the first object, and when the calculated matching rate is a threshold or more, output an authentication signal.

2. The biometric authentication device of claim 1, wherein the controller is further configured to:

control the depth sensing unit to calculate the first distance value of the second object when the second object is the first distance from the depth sensing unit, and calculate the second distance value of the second object when the second object is the second distance from the depth sensing unit, and compare a distance value change of the second object between the first distance value and the second distance value with a distance value change of the first object between the first distance value and the second distance value to calculate the matching rate.

3. The biometric authentication device of claim 1, wherein the controller is further configured to calculate a first horizontal position of the first object with respect to the depth sensing unit, and calculate a second horizontal position of the first object with respect to the depth sensing unit.

4. The biometric authentication device of claim 2, wherein the controller is further configured to:

calculate a first horizontal positon of the second object with respect to the depth sensing unit, and calculate a second horizontal positon of the second object with respect to the depth sensing unit, and compare the first horizontal position and the second horizontal position of the second object with the first horizontal position and the second horizontal position of the first object to calculate the matching rate.

5. The biometric authentication device of claim 1, wherein the controller is further configured to output the authentication signal, when the matching rate is satisfied for a preset time period or more.

6. The biometric authentication device of claim 1, wherein the controller is further configured to:

set a reference point of the first vein image of the first object and a reference point of the vein image of the second object, and calculate the matching rate by matching the reference point of the first vein image of the first object with the reference point of the vein image of the second object.

7. The biometric authentication device of claim 1, wherein the controller is further configured to calculate the matching rate by matching the first vein image of the first object with the vein image of the second object.

8. The biometric authentication device of claim 1, wherein the controller is further configured to:

control the depth sensing unit to calculate depth values for plural points of the first object, and calculate angle values from the depth values for the plural points, and wherein the first vein image of the first object is associated with the first distance value and the first angle values in the registration information.

9. The biometric authentication device of claim 8, wherein the controller is further configured to:

calculate an angle value of the second object, wherein the vein image of the second objet is associated with the distance value of the second object and the angle value of the second object, and compare the angle value and the distance value of the second object with the first distance value and a corresponding first angle value of the first object closest to the angle value of the second object to calculate the matching rate.

10. The biometric authentication device of claim 9, wherein the registration information comprises a table including plural first distance values and first angle values associated with plural first vein images of the first object.

11. The biometric authentication device of claim 10, wherein the controller is further configured to output the authentication signal, when the matching rate is satisfied for a preset time period or more.

12. The biometric authentication device of claim 10, wherein the registration information further comprises angle pattern information, and wherein the controller is further configured to compare an angle value change of the second object corresponding to the infrared light emitted by the infrared luminescent unit multiple times with the angle pattern information to calculate the matching rate.

13. The biometric authentication device of claim 1, further comprising:

a display unit, wherein the controller is further configured to:

set a region of interest for the second object, display a region of interest indicator on the display unit corresponding to the set region of interest, and display a guide indicator on the display unit to induce a location or angle change of the second object.

14. The biometric authentication device of claim 13, wherein the controller is further configured to:

control the depth sensing unit to obtain the vein image of the second object when the region of interest indicator matches the guide indicator corresponding to a specific point or angle value in which the region of interest indicator is displayed, and move the guide indicator corresponding to a different point or angle value from the guide indicator on the display unit, when the vein image of the second object is obtained.

15. The biometric authentication device of claim 1, wherein the controller is further configured to:

upsize or downsize at least one vein image of the first and second vein images of the first object and the vein image of second object based on the distance value of the first object and the distance value of the second object, and compare the upsized or downsized at least one vein image with the other vein image and calculate a matching rate based on a result of the comparison.

16. The biometric authentication device of claim 15, wherein the controller is further configured to:

upsize or downsize the first vein image of the first object or the vein image of the second object based on a ratio of the first object distance value to the second object distance value, and compare the two vein images with each other and calculate the matching rate based on a result of the comparison.

17. The biometric authentication device of claim 15, wherein the controller is further configured to:

control the depth sensing unit to calculate depth values for plural points of the first object and plural points of the second objects, respectively, calculate angle values of the first object and angle values of the second objects from the depth values, respectively, rotate at least one of the vein images of the first object or the vein images of the second object based on the angle values of the first object and the angle values of the second object, and compare the rotated vein image with the other vein image and calculate the matching rate based on the result of the comparison.

18. The biometric authentication device of claim 1, wherein the infrared luminescent unit and the depth sensing unit are a single module.

* * * * *